US011846828B2

(12) United States Patent
Close et al.

(10) Patent No.: US 11,846,828 B2
(45) Date of Patent: Dec. 19, 2023

(54) KINEMATIC OPTICAL MOUNT WITH STABILIZING LOCKING CLAMP

(71) Applicant: Arizona Board of Regents on Behalf of the University of Arizona, Tucson, AZ (US)

(72) Inventors: Laird M. Close, Tucson, AZ (US); Maggie Y. Kautz, Tucson, AZ (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 619 days.

(21) Appl. No.: 16/969,547

(22) PCT Filed: Feb. 8, 2019

(86) PCT No.: PCT/US2019/017340
§ 371 (c)(1),
(2) Date: Aug. 12, 2020

(87) PCT Pub. No.: WO2019/164686
PCT Pub. Date: Aug. 29, 2019

(65) Prior Publication Data
US 2021/0003816 A1    Jan. 7, 2021

Related U.S. Application Data

(60) Provisional application No. 62/632,544, filed on Feb. 20, 2018.

(51) Int. Cl.
*G02B 7/182* (2021.01)
*F16B 2/06* (2006.01)
*G02B 7/18* (2021.01)

(52) U.S. Cl.
CPC ............ *G02B 7/1825* (2013.01); *F16B 2/065* (2013.01); *G02B 7/181* (2013.01)

(58) Field of Classification Search
CPC ........ G02B 7/1825; G02B 7/181; F16B 2/065
See application file for complete search history.

(56) References Cited

U.S. PATENT DOCUMENTS 5,953,164 A * 9/1999 Arnone .................. G02B 7/003
359/822
2005/0163458 A1   7/2005 Nunnally et al.
(Continued)

OTHER PUBLICATIONS

PCT/US2019/017340 International Search Report and Written Opinion dated Jun. 11, 2019, 9 pp.

*Primary Examiner* — Euncha P Cherry
(74) *Attorney, Agent, or Firm* — Cozen O'Connor

(57) ABSTRACT

A stabilizing locking clamp for a kinematic optical mount includes a clamp plate configured for optical access and a plurality of clamp actuators affixed to the clamp plate. The clamp actuators are positioned such that each clamp actuator exerts a force on a front plate of the kinematic optical mount in a push-push configuration. A stabilizing kinematic optical mount includes a kinematic optical mount and a plurality of clamp arms, each clamp arm including a clamp actuator positioned to exert a force on a front plate of the kinematic optical mount in a push-push configuration. The stabilizing locking clamp and stabilizing kinematic optical mount reduce temperature-dependent and vibration-induced changes in pitch and yaw, thereby improving pointing stability for optical setups that rely on critical beam alignment.

20 Claims, 16 Drawing Sheets

(56) References Cited

U.S. PATENT DOCUMENTS

| | | |
|---|---|---|
| 2006/0104595 A1 | 5/2006 | Arnone |
| 2009/0219634 A1 | 9/2009 | Blanding et al. |
| 2010/0290138 A1 | 11/2010 | Thomas et al. |
| 2011/0292527 A1 | 12/2011 | Frankovich et al. |

\* cited by examiner

KINEMATIC OPTICAL MOUNT WITH STABILIZING LOCKING CLAMP

CROSS-REFERENCE TO RELATED APPLICATION

This application is a 35 U.S.C. 371 filing of International Application No. PCT/US2019/017340, filed Feb. 8, 2019, which claims priority to U.S. Provisional Patent Application No. 62/632,544, filed Feb. 20, 2018 and titled "A Kinematic Optical Mount with Stabilizing Locking Clamp", the entirety of which is incorporated herein by reference.

STATEMENT REGARDING FEDERALLY SPONSORED RESEARCH OR DEVELOPMENT

This invention was made with government support under Grant Nos. AST1625441 and AST1615408, awarded by NSF. The government has certain rights in the invention.

FIELD

Embodiments relate to optomechanics, and in particular, kinematic optical mounts.

BACKGROUND

Kinematic optical mounts are used in optical setups to achieve precise positioning of an optical beam or positioning of an optic with respect to the optical beam. An optical mount is "kinematic" when it fully constrains all six independent degrees of freedom (DOFs) of an optic. Three of the six DOFs are translational, corresponding to a position (e.g., x, y, and z) of the optic, and three are rotational, corresponding to orientation angles (e.g., clocking, pitch, and yaw) of the optic.

A kinematic optical mount typically includes a front plate in which an optic is securely affixed, and a rear plate that houses two or three linear actuators, each including a bushing (e.g., a threaded insert) and a screw. The rear and front plates are mechanically coupled together with a plurality of springs that pull the rear and front plates toward each other. At the end of each screw is a spherical tip that pushes against the front plate. As each screw turns and moves through the bushing, the springs extend and/or contract such that the front plate remains in a preloaded contact with the tips.

In one common configuration, a kinematic optical mount includes three linear actuators that contact the front plate near the corners, with the optic held in the middle of the front plate. The tip of each screw physically couples with a pad affixed to, or included in, the front plate. To constrain the six DOFs, one of the three pads is shaped as a cone, the second pad is shaped as a v-groove, and the third pad is a flat surface. The cone-shaped pad constrains the three translational DOFs, the v-groove pad constrains two rotational DOFs, and the flat pad constrains the third rotational DOF.

Some kinematic optical mounts include only two linear actuators with spherical tips contacting the groove pad and the flat pad, in which case the third contact between the front plate and the rear plate is provided by a ball bearing. In this two-actuator configuration, adjustment of the actuators may translate the optic away from the rear plate. In the configuration with three actuators describe above, the third actuator may be used to compensate for this translation.

SUMMARY OF THE EMBODIMENTS

While a kinematic optical mount advantageously allows the pitch and yaw of an optic to be adjusted with high precision, the thermal behavior of the springs may cause the pitch and/or yaw to disadvantageously change with temperature. This effect is often more pronounced for pitch, where the force of gravity acting downward on the front plate induces a sag that exacerbates the effect of temperature on the pitch.

Embodiments of the present invention provide a stabilizing locking clamp that advantageously applies forces to the front plate to further restrict motion of the front plate in the presence of temperature-dependent spring forces. When the stabilizing locking clamp is engaged with, or clamped to, a kinematic optical mount, temperature-dependent variation in pitch is reduced. The improved pointing stability achieved with embodiments may further improve setups that rely on critical beam alignment, such as interferometers, cavities, and coupling into small-mode optical fibers and waveguides. The stabilizing locking clamp described herein may be configured to work with existing kinematic optical mounts, advantageously allowing users to attain the stability improvements without incurring the time and cost of replacing existing mounts.

Certain prior-art kinematic optical mounts reduce temperature-dependent pitch and yaw by choosing materials, geometry, and configuration that compensate for the temperature-dependence of the spring's behavior. Examples of such temperature-compensated optical mounts include the Polaris® series by Thorlabs, and the Suprema ZeroDrift™ series by Newport. Disadvantageously, these temperature-compensated optical mounts may cost twice that of their uncompensated equivalents and there is still some drift. In addition, temperature-compensated optical mounts are typically made from steel-based materials, which are much heavier than the aluminum commonly used to construct uncompensated optical mounts.

In a first aspect, a stabilizing kinematic optical mount includes a rear plate, a front plate configured to receive an optic, a plurality of linear actuators mounted to the rear plate and configured to exert contact forces on the front plate, a plurality of clamp arms affixed to the rear plate and configured to allow optical access to the optic, and a plurality of clamp actuators mounted to the clamp arms and configured to exert clamp forces on the front plate opposing the contact forces.

In some embodiments of the first aspect, the clamp actuators are mounted to the clamp arms such that the clamp forces and the contact forces form a push-push configuration.

In some embodiments of the first aspect, each of the clamp actuators is positioned to exert one of the clamp forces on a front contact point of the front plate. In addition, each of the linear actuators is positioned to exert one of the contact forces on a rear contact point of the front plate.

In some embodiments of the first aspect, each of the clamp actuators includes a screw with a tip configured to physically couple with the front contact point in response to turning of the screw.

In some embodiments of the first aspect, each of the clamp actuators further includes a bushing that is internally threaded to receive the screw and affixed to one of the clamp arms with epoxy.

In some embodiments of the first aspect, each of the clamp actuators further includes a bushing that is internally threaded to receive the screw and affixed to one of the clamp arms by threading into a tapped hole formed by said one of the clamp arms.

In some embodiments of the first aspect, each of the clamp actuators is mounted to one of the clamp arms by a clamping mechanism.

In some embodiments of the first aspect, the plurality of clamp actuators includes three clamp actuators.

In a second aspect, a stabilizing locking clamp for a kinematic optical mount includes a clamp plate configured to allow optical access to an optic mounted in the kinematic optical mount, and a plurality of clamp actuators mounted to the clamp plate and configured to exert clamp forces on a front plate of the kinematic optical mount. The clamp forces oppose contact forces exerted by linear actuators of the kinematic optical mount on the front plate.

In some embodiments of the second aspect, the clamp actuators are mounted to the clamp plate such that the clamp forces and the contact forces form a push-push configuration.

In some embodiments of the second aspect, the clamp plate is configured to mount to a base such that the stabilizing locking clamp is in front of the optic while allowing optical access to the optic.

In some embodiments of the second aspect, the clamp plate is configured to mount to the base in both a left-hand configuration and a right-hand configuration.

In some embodiments of the second aspect, the clamp plate is configured to mount to a rear plate of the kinematic optical mount such that the stabilizing locking clamp is in front of the optic while allowing optical access to the optic.

In some embodiments of the second aspect, the clamp plate is configured to mount to the rear plate of the kinematic optical mount in both a left-hand configuration and a right-hand configuration.

In some embodiments of the second aspect, each of the clamp actuators is positioned to exert one of the clamp forces on a front contact point of the front plate of the kinematic optical mount.

In some embodiments of the second aspect, each of the clamp actuators includes a screw with a tip configured to physically couple with the front contact point in response to turning of the screw.

In some embodiments of the second aspect, each of the clamp actuators further includes a bushing that is internally threaded to receive the screw and affixed to the clamp plate with epoxy.

In some embodiments of the second aspect, each of the clamp actuators further includes a bushing that is internally threaded to receive the screw and affixed to the clamp plate by threading into a tapped hole formed by the clamp plate.

In some embodiments of the second aspect, each of the clamp actuators is mounted to the clamp plate by a clamping mechanism.

In some embodiments of the second aspect, the plurality of clamp actuators includes three clamp actuators.

In a third aspect, a stabilizing kinematic optical mount includes a stabilizing locking clamp, a kinematic optical mount, and a base to which the stabilizing locking clamp and the kinematic optical mount may be mounted such that clamp forces exerted by clamp actuators on a front plate of the kinematic optical mount oppose contact forces exerted by linear actuators.

In some embodiments of the third aspect, the base is configured such that the clamp forces and the contact forces form a push-push configuration.

In some embodiments of the third aspect, the base is further configured to position the stabilizing locking clamp in front of the optic while allowing optical access to the optic.

In some embodiments of the third aspect, the stabilizing locking clamp is configured to mount to the base in both a left-hand configuration and a right-hand configuration.

In some embodiments of the third aspect, each of the clamp actuators is positioned to exert one of the clamp forces on a front contact point of the front plate.

In some embodiments of the third aspect, each of the clamp actuators includes a screw with a tip configured to physically couple with the front contact point in response to turning of the screw.

In some embodiments of the third aspect, each of the clamp actuators further includes a bushing that is internally threaded to receive the screw and affixed to the clamp plate with epoxy.

In some embodiments of the third aspect, each of the clamp actuators further includes a bushing that is internally threaded to receive the screw and affixed to the clamp plate by threading into a tapped hole formed by the clamp plate.

In some embodiments of the third aspect, each of the clamp actuators is mounted to the clamp plate by a clamping mechanism.

In some embodiments of the third aspect, the plurality of clamp actuators includes three clamp actuators.

In a fourth aspect, a method that stabilizes a kinematic optical mount includes actuating a plurality of clamp actuators to exert on a front plate of the kinematic optical mount clamp forces that oppose contact forces exerted on the front plate by a plurality of linear actuators.

In some embodiments of the fourth aspect, actuating the clamp actuators includes actuating the clamp actuators in a sequence.

In some embodiments of the fourth aspect, the method further includes locking the clamp actuators after actuating the clamp actuators.

In some embodiments of the fourth aspect, the method further includes disengaging springs of the kinematic optical mount from the front plate after actuating the clamp actuators.

In some embodiments of the fourth aspect, the method further includes actuating the linear actuators, prior to actuating the clamp actuators, to position an optic mounted in the front plate of the kinematic optical mount.

In some embodiments of the fourth aspect, the method further includes driving, after actuating the clamp actuators, one or more of the linear actuators to correct a misalignment of an optic mounted in the front plate of the kinematic optical mount, the misalignment having been caused by actuating the clamp actuators.

DETAILED DESCRIPTION OF THE EMBODIMENTS

Figure 1:
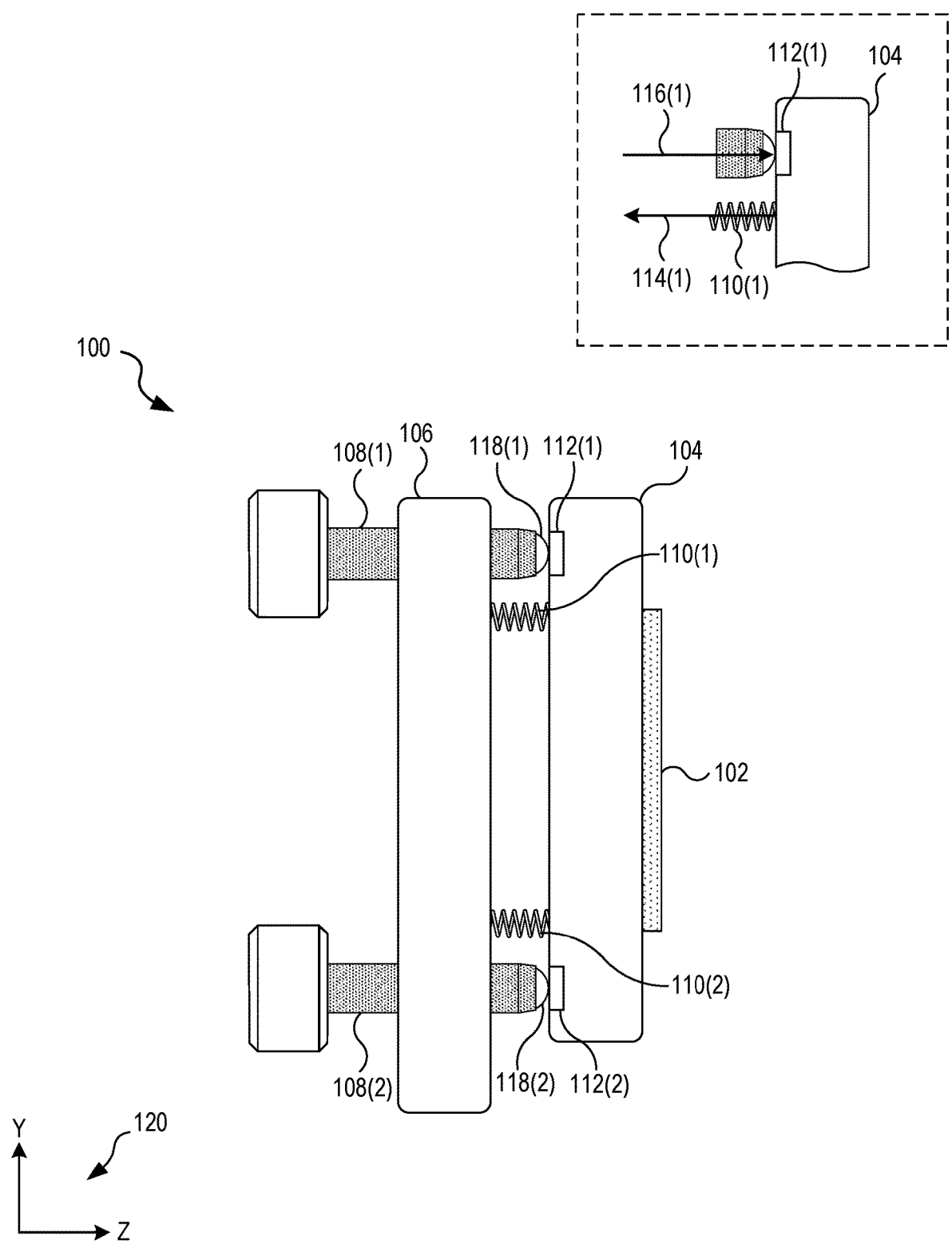
FIG. 1 is side view of an example kinematic optical mount used to position an optic affixed to a front plate.

FIG. 1 is a side view of an example kinematic optical mount 100 used to position an optic 102 affixed to a front plate 104. Linear actuators 108(1), 108(2) are mounted in a rear plate 106 and have spherical tips 118(1), 118(2) that physically couple with contact pads 112(1), 112(2) that are formed in, or affixed to, front plate 104. A pitch of front plate 104, and optic 102 affixed therein, may be adjusted by actuating linear actuator 108(1) to move contact pad 112(1) in the z-direction (see right-handed coordinate system 120). Similarly, a yaw of front plate 104, and optic 102 affixed therein, may be adjusted by actuating linear actuator 108(2) to move contact pad 112(2) in the z-direction.

Kinematic optical mount 100 also includes preloaded springs 110(1) and 110(2) that pull on front plate 104 and rear plate 106 to ensure that front plate 104 fully contacts spherical tips 118(1), 118(2) at respective contact pads 112(1), 112(2). As shown in FIG. 1, one end of each of springs 110(1) and 110(2) is affixed to rear plate 106 with the other end being affixed to front plate 104. Although FIG. 1 shows two springs 110(1) and 110(2), more springs (e.g., four springs) may be connected between front plate 104 and rear plate 106 to increase the force holding front plate 104 against spherical tips 118(1) and 118(2).

Figure 2:
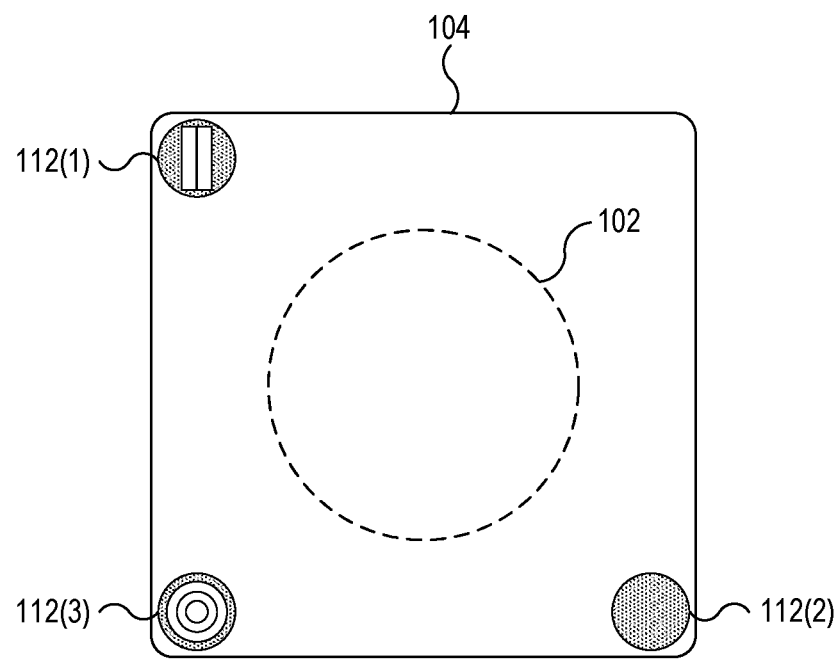
FIG. 2 is a rear view of the front plate of the kinematic optical mount of FIG. 1, showing locations of contact pads relative to the optic.

FIG. 2 is a rear view of front plate 104 of kinematic optical mount 100 of FIG. 1, showing locations of contact pads 112(1), 112(2), and 112(3) relative to optic 102. Contact pad 112(3) may accept a spherical tip of a third linear actuator mounted in rear plate 106 and used similarly to linear actuators 108(1) and 108(2), or a ball bearing that also physically couples with rear plate 106. As shown FIG. 2, contact pads 112(1), 112(2), and 112(3) may be shaped as a v-groove, flat, and cone for constraining all six degrees of freedom that define a position and orientation of front plate 104.

As linear actuator 108(1) is actuated and contact pad 112(1) moves in the z-direction, spring 110(1) changes length, thereby changing a spring preload force 114(1) exerted on front plate 104. Linear actuator 108(1) exerts a contact force 116(1) on contact pad 112(1) that opposes spring preload force 114(1), as shown in FIG. 1. Similar arguments hold for linear actuator 108(2) and spring 110(2). When front plate 104 is at rest in the z-direction, the sum of all spring preload forces 114 pulling on front plate 104 equals the sum of all contact forces 116 pushing on front plate 104.

Spring preload forces 114 may depend on temperature, for example, due to a coefficient of thermal expansion of the spring material, or a temperature dependence of the elastic modulus of the spring material. In any case, as spring preload forces 114 change with temperature, contact forces 116 exerted by linear actuators 108 on contact pads 112 change accordingly to ensure that front plate 104 remains at rest. Furthermore, front plate 104 may flex with temperature since spring preload forces 114 and contact forces 116 are exerted on front plate 104 at different positions, and front plate 104 has a finite elastic modulus (e.g., front plate 104 is not perfectly rigid). As a result, temperature-dependent spring preload forces 114 may manifest as temperature-dependent changes in pitch and yaw of front plate 104.

Applicant has found that commercial kinematic optical mounts display a temperature dependence of pitch that is greater than a temperature dependence of yaw. This difference between thermal behaviors of pitch and yaw may be attributed to a gravitational force acting on front plate 104 at a center-of-mass point that is offset in the z-direction from spherical tips 118(2) and 118(3). As a result, gravitational force creates a torque on front plate 104 that tends to tilt front plate 104 forward (in the positive z direction) and downward (in the negative y direction). Torque due to gravitational force is balanced by torques, or preload, created by spring preload forces 114, such that front plate 104 is at rest. Nevertheless, as spring preload forces 114 change with temperature of kinematic optical mount 100, the pitch of kinematic optical mount 100 may change as a result.

Applicant requires kinematic optical mounts for steering light beams over several meters, in an environment having a temperature that may change by several degrees Celsius, with a pointing stability (e.g., drift) better than what can be achieved with existing kinematic optical mounts. Applicant also requires kinematic optical mounts large enough to hold mirrors having a diameter of at least three inches. Applicant has found that commercial thermally-compensated kinematic optical mounts do not exhibit temperature dependence of pitch as low as claimed by the manufacturer. Applicant has also found that thermally-compensated kinematic optical mounts are only commercially available for optics having a diameter of two inches or less.

Accordingly, Applicant has developed a stabilizing locking clamp that may be used with a kinematic optical mount, either thermally-compensated or non-thermally-compensated, to overcome one or more of the drawbacks discussed above. The stabilizing locking clamp described herein reduces temperature dependence (e.g., angular deflection angle during thermal shock) of pitch below levels claimed by manufacturers for thermally-compensated kinematic optical mounts. It also reduces drift and pitch and yaw after thermal shock to the lowest levels claimed by the best manufactures.

Figure 3:
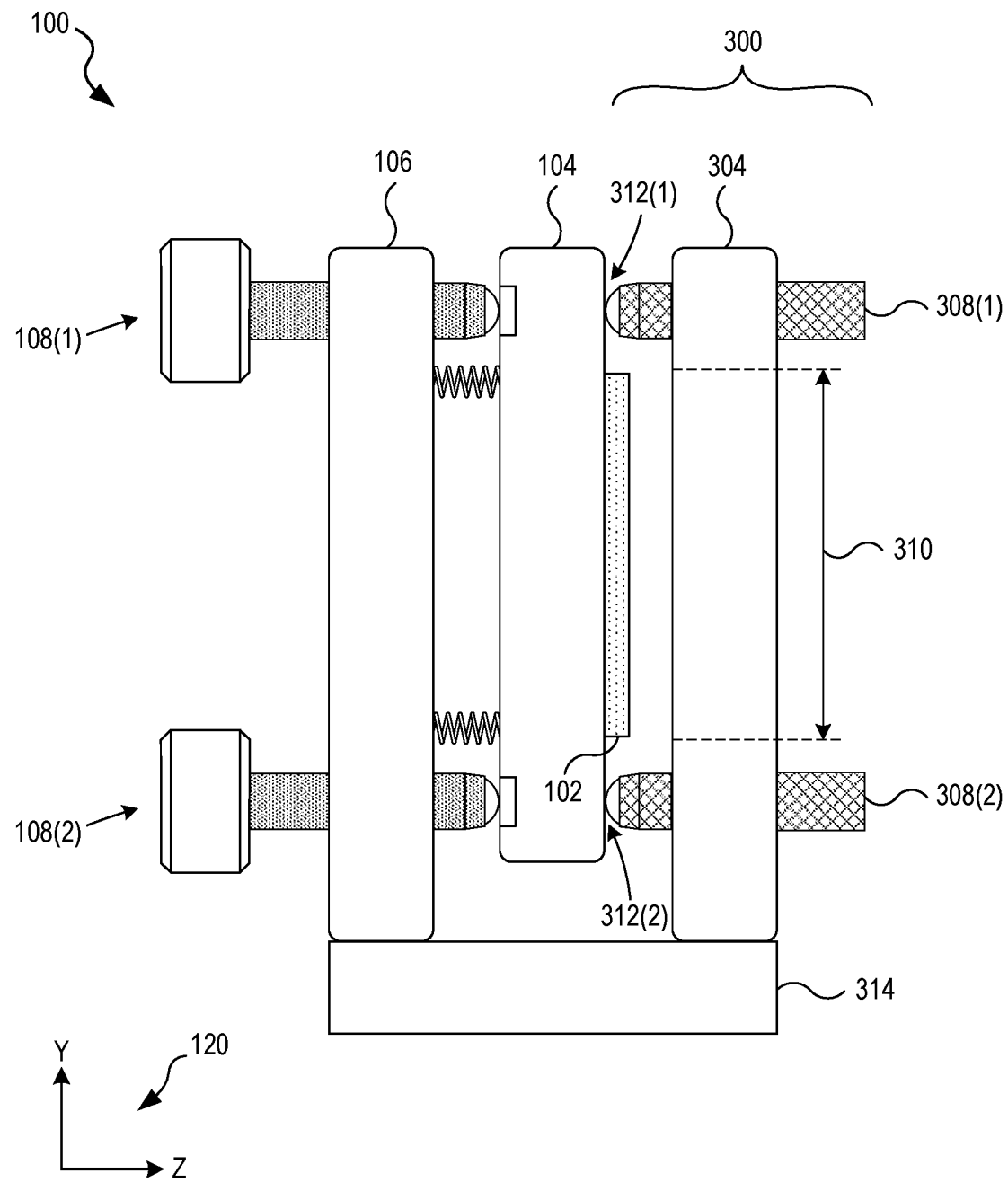
FIG. 3 shows an example of a stabilizing locking clamp used to reduce temperature- and/or vibration-dependent changes in the pitch and yaw of the kinematic optical mount of FIGS. 1 and 2, in embodiments.

FIG. 3 shows an example of a stabilizing locking clamp 300 used to reduce temperature- and/or vibration-dependent changes in the pitch and yaw of kinematic optical mount 100 of FIGS. 1 and 2. Stabilizing locking clamp 300 includes a clamp plate 304 positioned in front of (in the positive-z direction) front plate 104, and three clamp actuators 308(1), 308(2), and 308(3) mounted in clamp plate 304. Each of clamp actuators 308(1), 308(2), and 308(3) may be actuated to contact front plate 104 at respective front contact points 312(1), 312(2), and 312(3). Clamp plate 304 and rear plate 106 are mounted to a base 314 that serves as a mechanical ground. Clamp plate 304 forms a clear aperture 310 that allows light to reach optic 102. For example, clear aperture 310 may be a hole machined in clamp plate 304 through which a light beam passes to reach optic 102. For clarity, clamp actuator 308(3), front contact point 312(3), and linear actuator 108(3) are not shown in FIG. 3 (see clamp actuator 308(3) in FIG. 5).

Although FIG. 3 shows stabilizing locking clamp 300 with three clamp actuators 308 for use with kinematic optical mount 100 having three linear actuators 108, stabilizing locking clamp 300 may have any number of clamp actuators 308 without departing from the scope hereof. For example, stabilizing locking clamp 300 may have only two clamp actuators 308 for use with kinematic optical 100 having two linear actuators 108.

Figure 4:
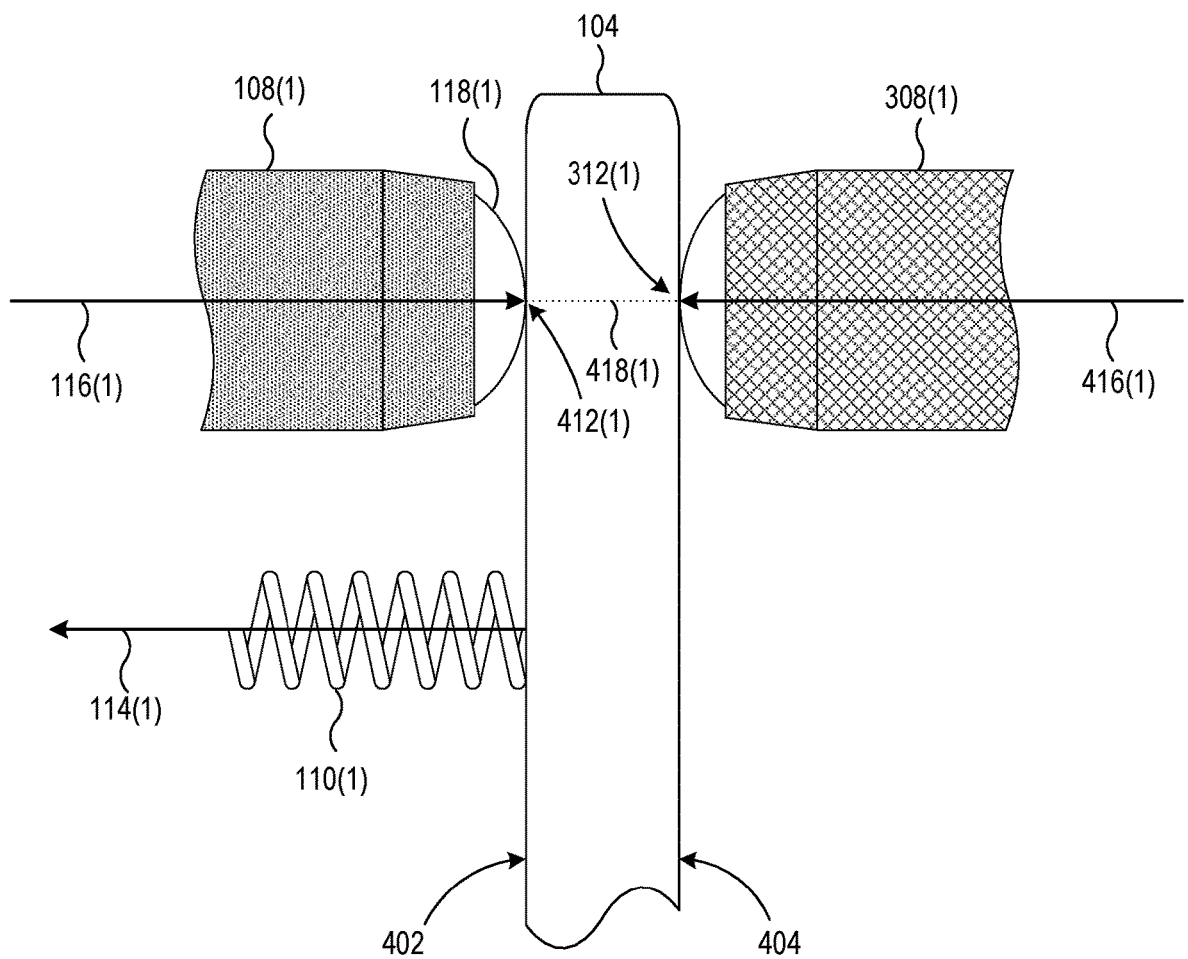
FIG. 4 is a side view of a portion of the front plate of the kinematic optical mount of FIGS. 1-3, showing horizontal forces applied to the front plate, in embodiments.

FIG. 4 is a side view of a portion of front plate 104 of kinematic optical mount 100, showing horizontal forces applied to front plate 104. Clamp actuator 308(1) applies a clamp force 416(1) to a front face 404 of front plate 104 at front contact point 312(1). Spring 110(1) exerts spring preload force 114(1) on a rear face 402 of front plate 104 in a similar direction to clamp force 416(1). Linear actuator 108(1) applies contact force 116(1) at a rear contact point 412(1) such that contact force 116(1) opposes clamp force 416(1) (and spring preload force 114(1)), i.e., clamp force 416(1) and contact force 116(1) point in opposite directions. Similar arguments hold for other linear actuators 108, clamp actuators 308, and springs 110.

In FIG. 4, front contact point 312(1) is located on front face 404 opposite rear contact point 412(1) on rear face 402. That is, contact points 312(1) and 412(1) have the same x and y values, but different z values. Thus, opposing clamp force 416(1) and contact force 116(1) coincide with a dashed line 418(1) that joins front contact point 312(1) and rear contact point 412(1). Although not shown in FIG. 4, front contact points 312(2) and 312(3) are similarly located on rear face 402 so that corresponding clamp forces 416(2) and 416(3) oppose contact forces 116(2) and 116(3), respectively.

Opposing clamp forces 416 and contact forces 116 push on front plate 104 from opposite directions, an arrangement referred to herein as a "push-push configuration." Advantageously, clamp forces 416 add to spring preload forces 114, effectively increasing a preload on front plate 104. In turn, clamp forces 416 increase contact forces 116 exerted by linear actuators 108 on front plate 104. Larger contact forces 116 generated by the push-push configuration help counteract a torque on front plate 104 due to gravity, as described above, and therefore help restrict motion of front plate 104 as the temperature of springs 110 change. With an increased preload from clamp forces 416, kinematic optical mount 100 may tolerate larger vibrations (e.g., with an amplitude exceeding spring preload forces 114). Thus, the push-push configuration increases stiffness of kinematic optical mount 100, reducing sensitivity of kinematic optical mount 100 to external vibrations.

While FIG. 4 shows spherical tip 118(1) physically coupling with front plate 104 at one rear contact point 412(1), spherical tip 118(1) may physically couple with front plate 104 via a v-groove or a cone (e.g., see contact pads 112(1) and 112(3) of FIG. 2). In these cases, spherical tip 118(1) exerts contact force 116(1) onto front plate 104 according to a pressure distribution that varies in the x and y directions, and rear contact point 412(1) may represent a center of the pressure distribution in the x and y directions. For example, when front plate 104 includes a v-groove or cone against which spherical tip 118(1) exerts contact force 116(1), rear contact point 412(1) may represent a center (in the x and y directions) of the groove or cone.

Figure 5:
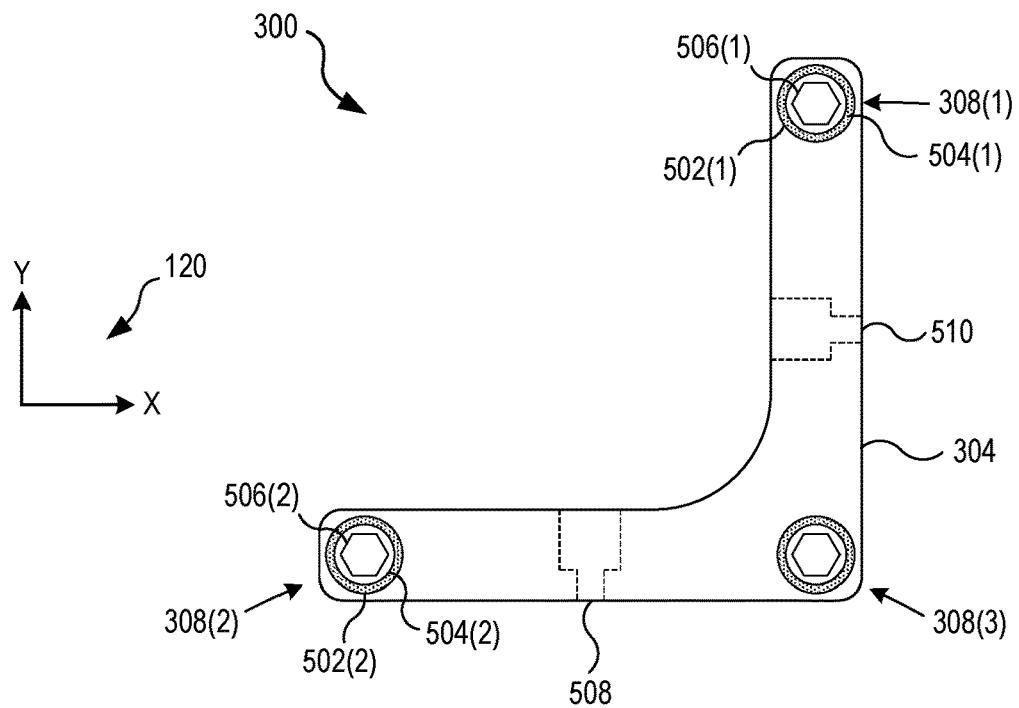
FIGS. 5 and 6 are front and side views, respectively, of the example stabilizing locking clamp of FIG. 3, in embodiments.
Figure 6:
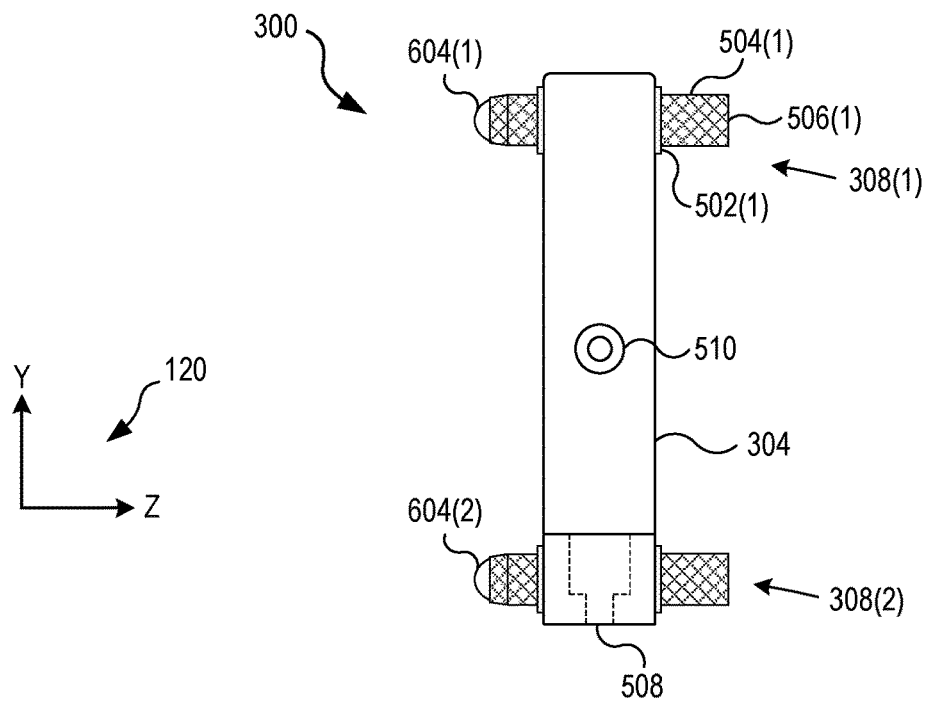

FIGS. 5 and 6 are front and side views, respectively, of stabilizing locking clamp 300 of FIG. 3. Clamp actuator 308(1) includes a screw 504(1) with a tip 604(1) that physically couples with front plate 104 (e.g., at front contact point 312(1) of FIGS. 3 and 4) in response to turning of screw 504(1). Clamp actuator 308(1) may include a threaded bushing 502(1) affixed to clamp plate 304 and internally threaded to receive screw 504(1). Threaded bushing 502(1) may be affixed to clamp plate 304 with epoxy or a clamping mechanism. When threaded bushing 502(1) has external threads, clamp plate 304 may form a tapped hole into which bushing 502(1) may be threaded. Alternatively, clamp plate 304 may form a hole tapped to directly receive screw 504(1) without bushing 502(1). Screw 504(1) may be a ball-tipped screw having a ball tip 604(1). Screw 504(1) may be configured with a hex socket head 506(1) to receive an Allen key or hexagonal ball driver. Clamp actuators 308(2) and 308(3) are configured similarly to clamp actuator 308(1), and may affix to clamp plate 304 similarly to clamp actuator 308(1).

Clamp plate 304 may also include mounting holes 508 and 510 for mounting stabilizing locking clamp 300 to another component (e.g., base 314 of FIG. 3). Mounting holes 508 and 510 are oriented perpendicularly such that stabilizing locking clamp 300 may be mounted in either a left-hand or right-hand configuration. In the example of FIGS. 5 and 6, each of mounting holes 508 and 510 is a counterbore hole that accepts a socket-head cap screw. Alternatively, each of mounting holes 508 and 510 may be a tapped hole, countersunk hole, or through hole.

When clamp plate 304 is affixed in front of kinematic optical mount 100 (e.g., using base 314), stabilizing locking clamp 300 may be clamped by actuating each of clamp actuators 308(1), 308(2), and 308(3) to physically couple with front face 404 at front contact points 312(1), 312(2), and 312(3), respectively. When clamp actuators 308 are actuated with a ball driver or Allen key, each of clamp actuators 308 may be actuated until a user feels, with the ball driver or Allen key, resistance indicating that clamp actuator 308 has physically coupled to front face 404 of front plate 104. After clamp actuators 308 are physically coupled with front face 404, clamp actuators 308 may be further actuated to increase clamp forces 416 and contact forces 116 accordingly. Clamp actuators 308 may also be actuated in a sequence to minimally disturb orientation of front plate 104. After clamp actuators 308 are actuated, clamp actuators 308 may be locked so that clamp actuators 308 may not be further actuated. For example, when each of clamp actuators 308 includes screw 504, each of clamp actuators 308 may be locked by tightening a locking nut threaded onto screw 504.

Figure 7:
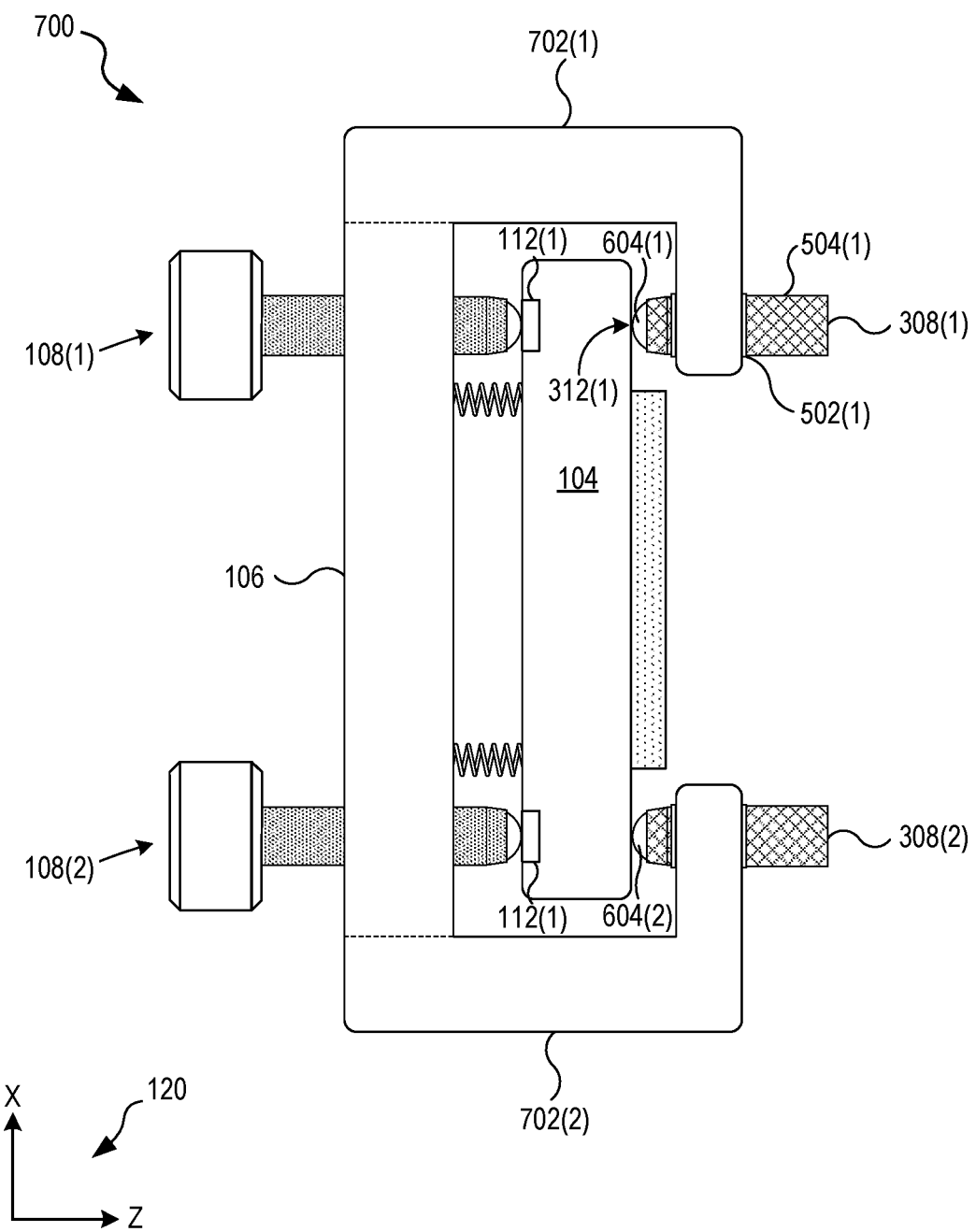
FIGS. 7 and 8 are top and front views, respectively, of an example stabilizing kinematic optical mount that combines the kinematic optical mount of FIGS. 1 and 2 with three clamp arms, in embodiments.
Figure 8:
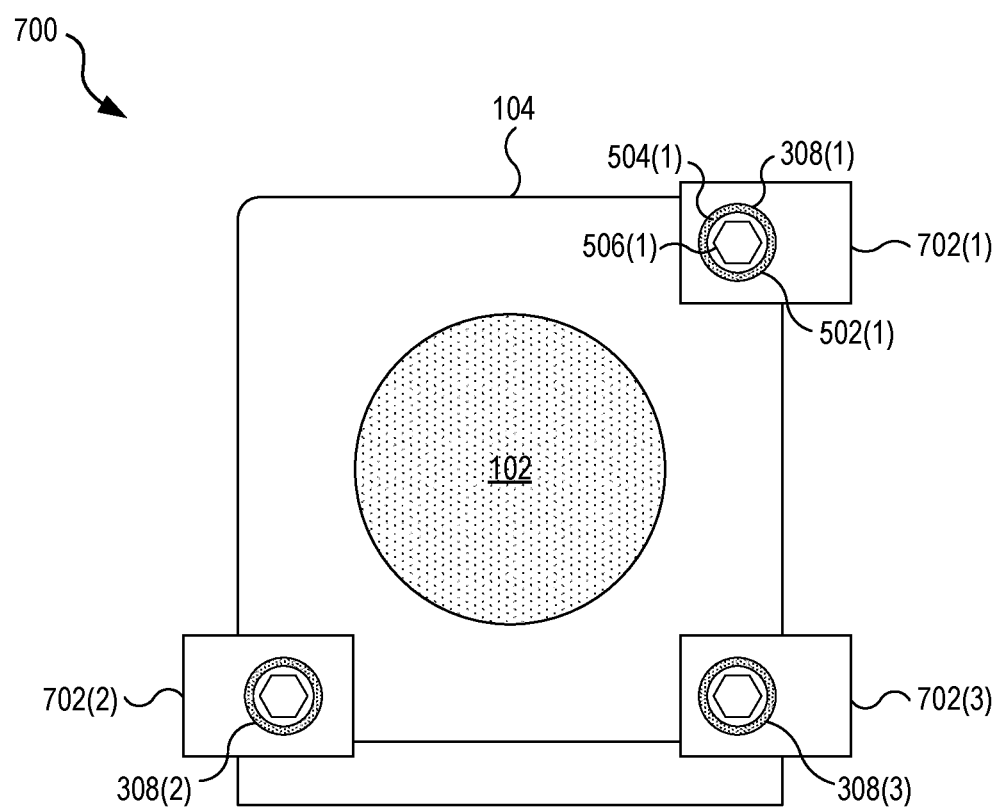
Figure 8:
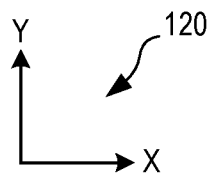

FIGS. 7 and 8 are top and front views, respectively, of an example stabilizing kinematic optical mount 700 that combines kinematic optical mount 100 of FIG. 1 with three clamp arms 702(1), 702(2), and 702(3). Together, clamp arms 702(1), 702(2), and 702(3) replace clamp plate 304 of FIG. 3, allowing three clamp actuators 308(1), 308(2), and 308(3) to be mechanically referenced directly to rear plate 106 without base 314. Each of clamp arms 702 may be affixed to rear plate 106 with a screw, wherein rear plate 106 is configured to accept the screw (e.g., via one or more tapped holes). Alternatively, each of clamp arms 702 may be affixed to rear plate 106 with epoxy. Alternatively, rear plate 106 and clamp arms 702 may be formed as a single structure from one piece of stock. For clarity, clamp arm 702(3), and clamp actuator 308(3) mounted therein, are not shown in FIG. 7.

Each of clamp actuators 308 may be mounted to one of clamp arms 702 similarly to clamp plate 304. For example, FIG. 7 shows clamp actuator 308(1) including screw 504(1) with tip 604(1) that physically couples with front plate 104 at front contact point 312(1) in response to turning of screw 504(1). FIG. 7 also shows clamp actuator 308(1) including a threaded bushing 502(1) affixed to clamp arm 702(1) and internally threaded to receive screw 504(1). Threaded bushing 502(1) may be affixed to clamp arm 702(1) with epoxy or a clamping mechanism. When threaded bushing 502(1) has external threads, clamp arm 702(1) may form a tapped hole into which bushing 502(1) may be threaded. Alternatively, clamp arm 702(1) may form a hole tapped to directly receive screw 504(1) without bushing 502(1). Clamp actuators 308(2) and 308(3) are configured similar to clamp actuator 308(1), and may affix to respective clamp arms 702(2) and 702(3) similarly to clamp actuator 308(1).

Although FIGS. 7 and 8 show stabilizing kinematic optical mount 700 with three clamp actuators 308 mounted in three clamp arms 702, stabilizing kinematic optical mount 700 may be configured with a different number of clamp arms 702 and/or clamp actuators 308 without departing from the scope hereof. For example, stabilizing kinematic optical mount 700 may have two clamp actuators 308 mounted in two clamp arms 702 for use with two linear actuators 108. Alternatively, one of clamp arms 702 may be configured to house two or more of clamp actuators 308.

In some embodiments, a stabilizing kinematic optical mount includes kinematic optical mount 100, stabilizing locking clamp 300, and base 314, as shown in FIG. 3. In one embodiment, clamp plate 304 is configured to mount directly to rear plate 106 without base 314. Clamp plate 304 may be further configured to mount to rear plate 106 in both a left-hand configuration and a right-hand configuration. In another embodiment, base 314 is integrated with rear plate 106 of kinematic optical mount 100. For example, base 314 and rear plate 106 may be formed from one piece of stock. Alternatively, base 314 may be integrated with clamp plate 304, or both rear plate 106 and clamp plate 304.

In one embodiment, springs 110 are removed or disengaged from front plate 104 after clamp actuators 308 are actuated, leaving front plate 104 secured with only clamp actuators 308 and linear actuators 108. Springs 110 may be removed or disengaged from front plate 104 to reduce stress on front plate 104 and optic 102 affixed therein. For example, one end of each of springs 110 may be affixed to a spring actuator that mounts to rear plate 106 and is translatable along the z-direction (similar to linear actuators 108). After clamp actuators 308 are clamped, the spring actuators may be actuated (i.e., translated along the negative-z direction) to move springs 110 away from front plate 104 to no longer physically couple with front plate 104.

Figure 9:
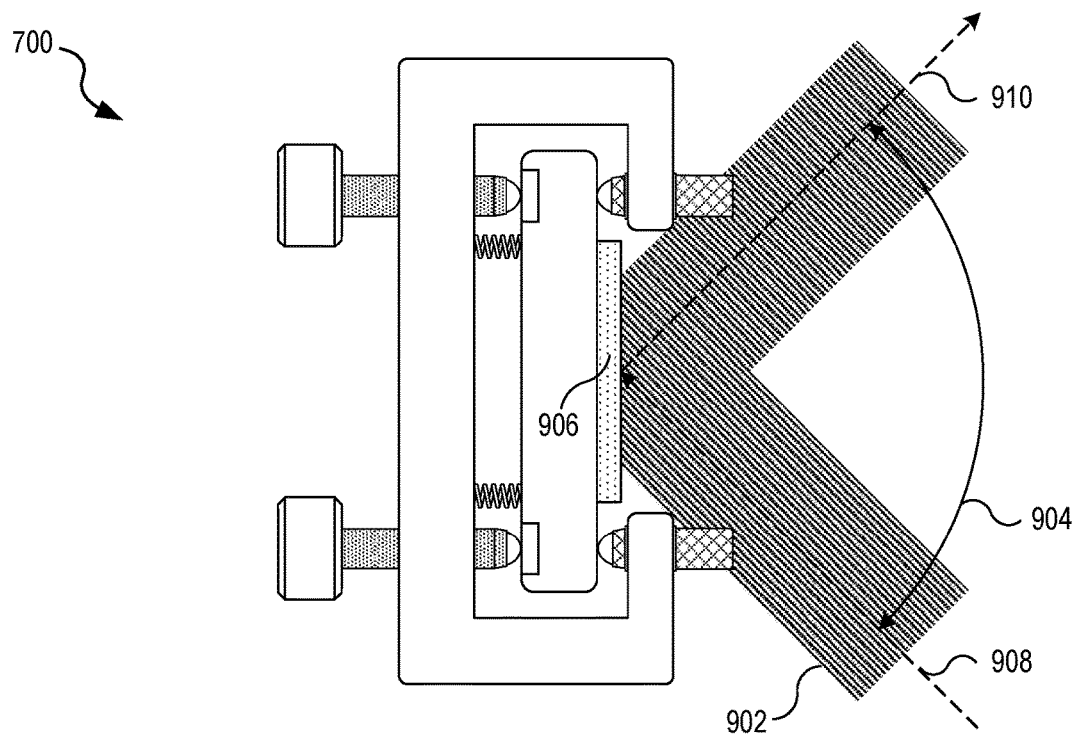
FIGS. 9 and 10 show a planar mirror mounted in the stabilizing kinematic optical mount of FIGS. 7 and 8 reflecting a light beam at an angle, in embodiments.
Figure 10:
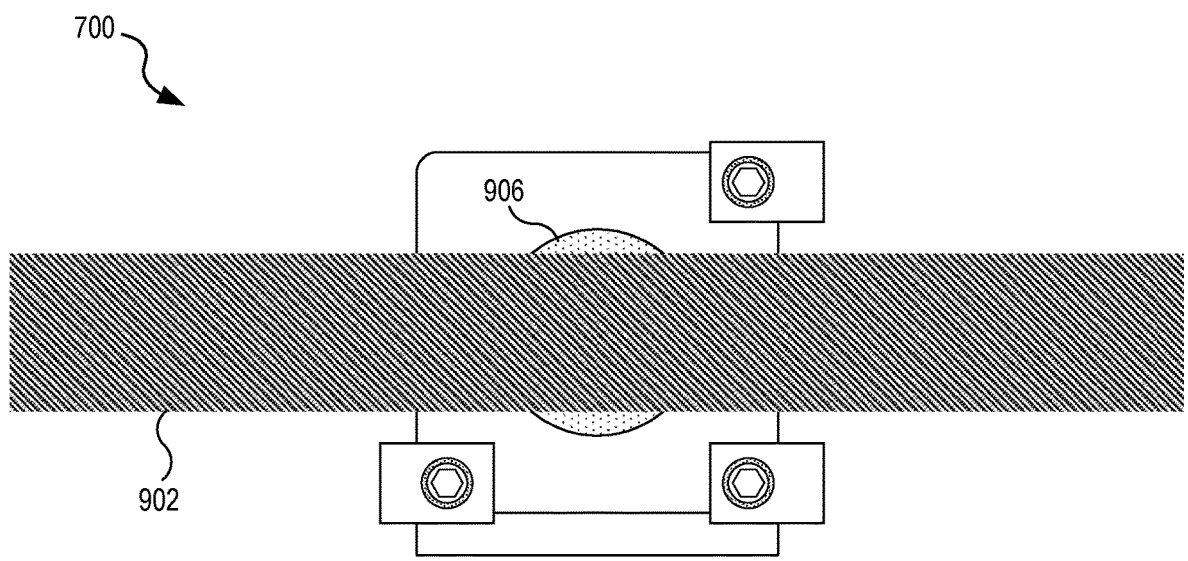

FIGS. 9 and 10 show a planar mirror 906 mounted in stabilizing kinematic optical mount 700 of FIGS. 7 and 8 reflecting a light beam 902 at an angle 904. Advantageously, stabilizing kinematic optical mount 700 of FIGS. 7 and 8 may provide a larger clear aperture than stabilizing locking clamp 300 by removing portions of clamp plate 304 that interfere with light beam 902. In the example of FIGS. 9 and 10, angle 904 is 90 degrees, wherein mirror 906 steers light beam 902 to an outgoing direction 910 that is perpendicular to an incoming direction 908. Alternatively, angle 904 may be 0 degrees, wherein mirror 906 retroreflects light beam 902 back onto itself.

Figure 11:
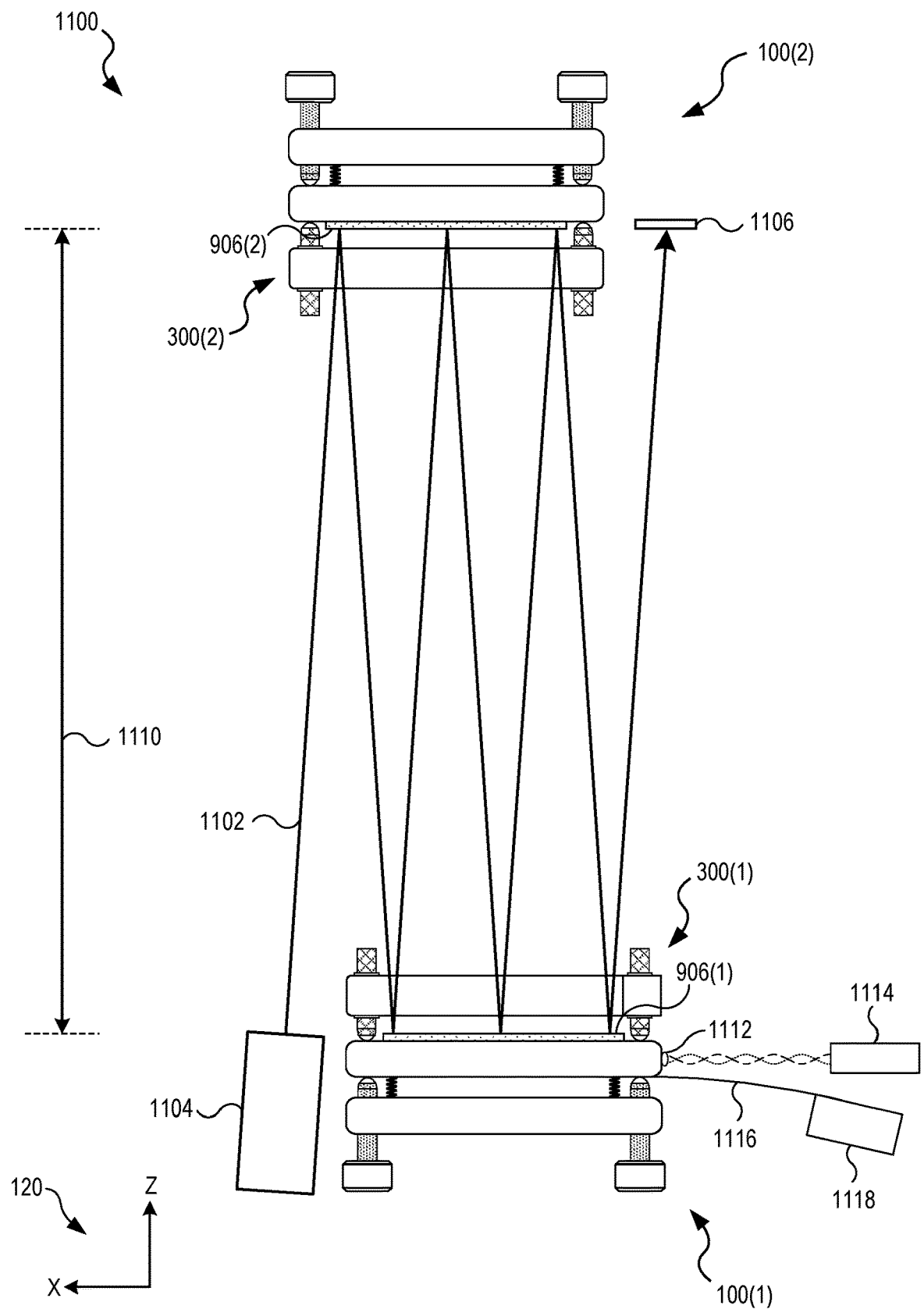
FIGS. 11 and 12 are top and side views, respectively, of an experimental setup for measuring temperature dependences of the pitch and yaw of the kinematic optical mount of FIGS. 1-2.
Figure 12:
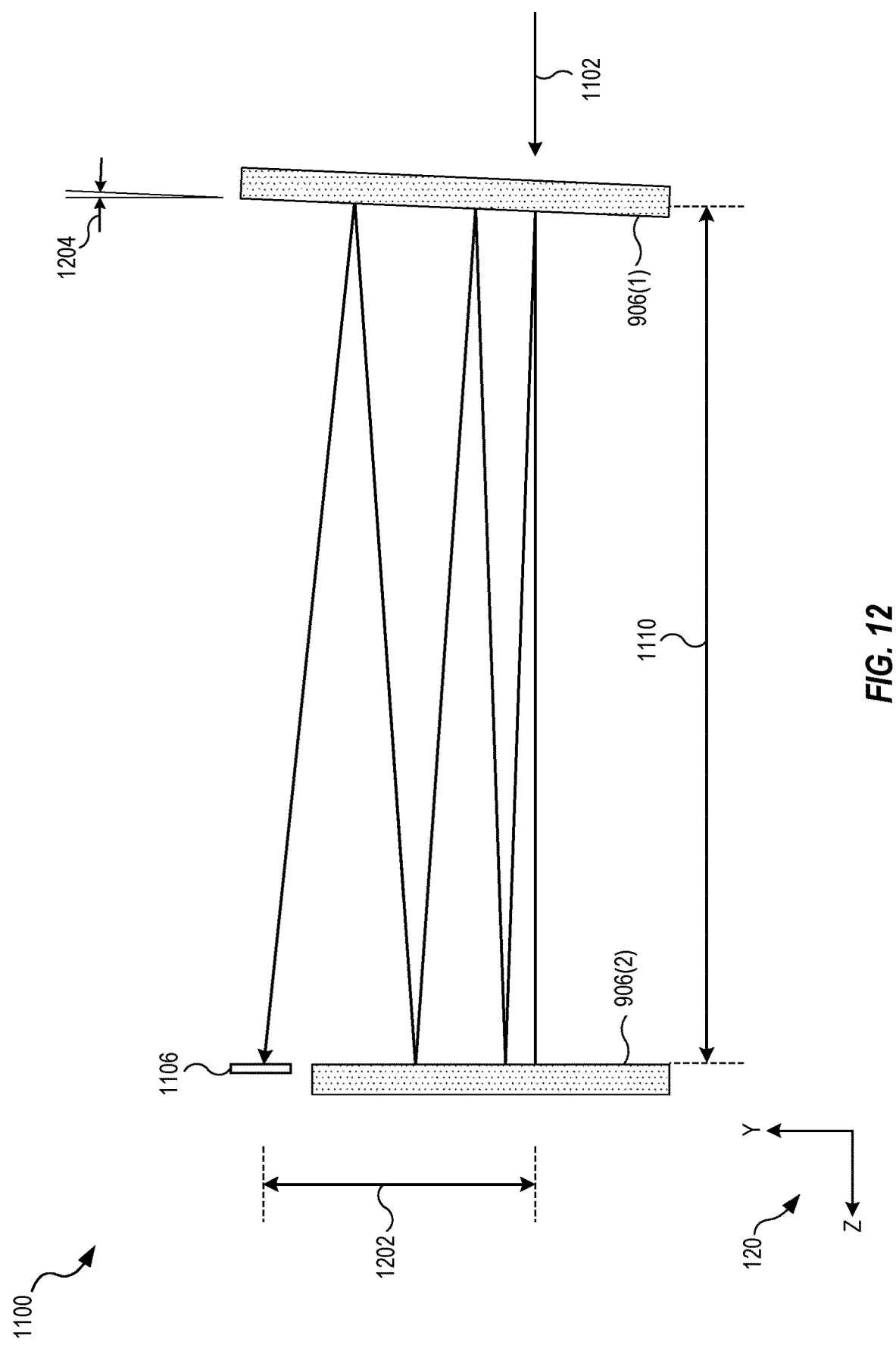

FIGS. 11 and 12 are top and side views, respectively, of an experimental setup 1100 for measuring temperature dependences of the pitch and yaw of kinematic optical mount 100, with and without clamping. Planar mirrors 906(1) and 906(2) are mounted in respective kinematic optical mounts 100(1) and 100(2) separated by a mirror displacement 1110 in the z-direction (see coordinate system 120). Planar mirrors 906(1) and 906(2) are counterfacing such that a laser beam 1102, emitted by a laser 1104, is steered via a plurality of reflections between planar mirrors 906(1) and 906(2). Kinematic optical mounts 100(1) and 100(2) may be clamped by stabilizing locking clamps 300(1) and 300(2), respectively.

After the plurality of reflections, laser beam 1102 hits a beam target 1106 for measuring a position of laser beam 1102. Beam target 1106 may be, for example, a piece of paper with equally-spaced markings, such as quad-ruled paper, or a ruler. Position of laser beam 1102 may be measured by taking a digital photograph of laser beam 1104 hitting beam target 1106, using equally-spaced markings on beam target 1106 to calibrate a pixel size of the digital photograph, and counting pixels of the digital photograph to determine shifts in position of laser beam 1102. Alternatively, beam target 1106 may be a digital camera or two-dimensional imaging array, such as a CCD camera or CMOS camera, that directly images laser beam 1102. Alternatively, beam target 1106 may be a four-quadrant photodetector.

As shown in FIG. 11, a temperature of kinematic optical mount 100(1) may be changed by heating kinematic optical mount 100(1) with a heat source 1118 that drives a heat conduit 1116 thermally coupled to kinematic optical mount 100(1). Alternatively, kinematic optical mount 100(1) may be heated via hot air from a heat gun, or via Joule heating of an electrically resistive element thermally coupled to kinematic optical mount 100(1) and electrically driven to produce heat. In any case, the temperature of kinematic optical mount 100(1) may be sensed with a temperature sensor 1112 thermally coupled to kinematic optical mount 100(1) and electrically coupled to a temperature reader 1114. Temperature sensor 1112 may be a thermistor, platinum resistor, thermocouple, probe, digital temperature sensor, or other element configured to sense temperature. Temperature reader 1114 may be any circuit configured to electrically couple with temperature sensor 1112 and process electrical signals outputted by temperature sensor 1112 indicative of the temperature of kinematic optical mount 100(1). For example, temperature reader 1114 may be a thermistor meter, thermocouple meter, RTD meter, or multimeter, depending upon a type of temperature sensor 1112. Temperature reader 1114 may display a measured temperature of kinematic optical mount 100(1). Alternatively, temperature sensor 1112 and temperature reader 1114 may cooperate as a thermometer to sense and display the temperature of kinematic optical mount 100(1).

FIG. 12 shows experimental setup 1100 being used to measure the temperature dependence of a pitch 1204 of planar mirror 906(1). For clarity, FIG. 12 only shows laser beam 1102, planar mirrors 906(1) and 906(2), and beam target 1106. Planar mirror 906(1) is shown in FIG. 12 having pitch 1204, relative to the y-axis (see coordinate system 120), such that planar mirrors 906(1) and 906(2) are no longer counterfacing. Laser beam 1102 approaches planar mirrors 906(1) and 906(2) parallel to the z-axis. As laser beam 1102 reflects off planar mirrors 906(1) and 906(2), laser beam 1102 is increasingly steered in the positive y direction. In other words, an angle between laser beam 1102 and the z-axis increases with each reflection. Where laser beam 1102 hits beam target 1106, laser beam 1102 is shifted in the y-direction by a y-displacement 1202.

In the example of FIG. 12, where laser beam 1102 reflects six times off planar mirrors 906(1) and 906(2), y-displacement 1202 equals eighteen times a product of mirror displacement 1110 and pitch angle 1204, in the small-angle approximation where the tangent of a value of pitch angle 1204 is replaced by the value of pitch angle 1204. Therefore, a change $\Delta\theta$ in pitch 1204 of kinematic optical mount 100(1) may be obtained by dividing a measured change $\Delta y$ in y-displacement 1202 by 18 times mirror displacement 1110. To improve a resolution of $\Delta\theta$, mirror displacement 1110 and/or a number of reflections between planar mirrors 906(1), 906(2) may be increased. A change in yaw of kinematic optical mount 100(1) may be obtained in a likewise manner by measuring a change $\Delta x$ in an x position of laser beam 1102 hitting beam target 1106.

Using experimental setup 1100 of FIGS. 11 and 12, Applicant thermally cycled kinematic optical mount 100(1) while stabilizing locking clamp 300(1) was clamped to kinematic optical mount 100(1), and simultaneously measured changes in the pitch and yaw of kinematic optical mount 100(1). Specifically, Applicant heated kinematic optical mount 100(1) using heat source 1118 to increase the temperature of kinematic optical mount 100(1) by 3° C. Applicant measured pitch 1204 to have changed by 1.5 microradians, corresponding to a temperature coefficient of 0.5 microradians per degree Celsius. Applicant also measured pitch 1204 to have returned to an initial pitch as the temperature of kinematic optical mount 100(1) returned to an initial temperature after heating with heat source 1118 was stopped (i.e., the thermal cycling was stopped).

In another experiment, the temperature of kinematic optical mounts 100(1) and 100(2) was changed by adjusting a temperature of a laboratory in which experimental setup 1100 was located. In this experiment, heat source 1118 was not used.

Figure 13:
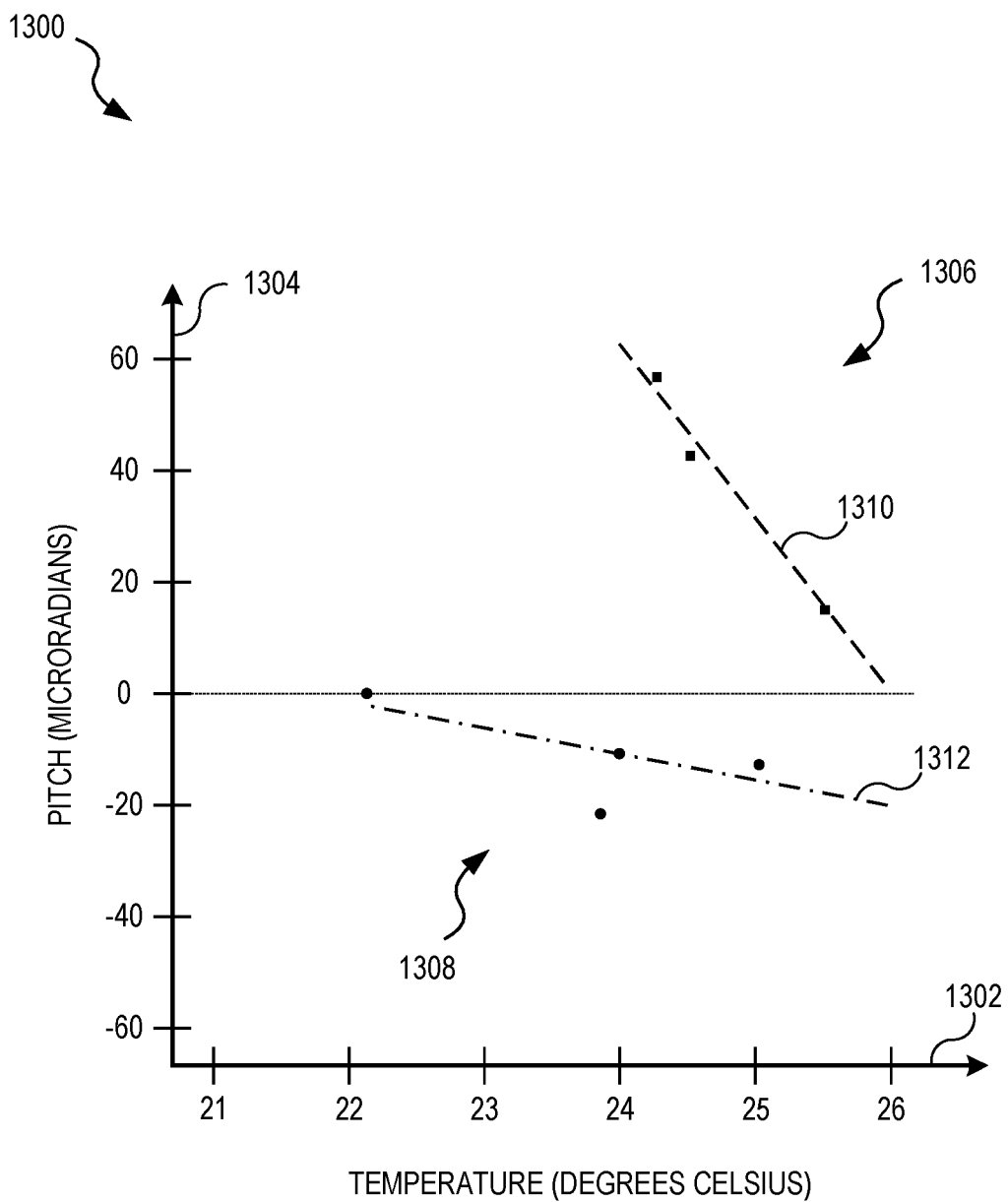
FIG. 13 is a plot showing pitch as a function of room temperature, as measured with the experimental setup of FIGS. 11 and 12.

FIG. 13 is a plot 1300 showing pitch as a function of room temperature, as measured by Applicant with experimental setup 1100 of FIGS. 11 and 12 according to the above description (i.e., without operation of heat source 1118). An x-axis 1302 and a y-axis 1304 of plot 1300 represent temperature in degrees Celsius and pitch in microradians, respectively. Square data points 1306 and circle data points 1308 were obtained with stabilizing locking clamps 300(1) and 300(2) unclamped and clamped, respectively. Mirror displacement 1110 was 2880 millimeters, and laser beam 1102 was reflected off planar mirrors 906(1), 906(2) six times. The x and y positions of laser beam 1102 on beam target 1106 were photographically cross-correlated to an uncertainty of 0.1 millimeters, equivalent to 2 microradians of pitch.

In plot 1300, dashed line 1310 and dashed-dotted line 1312 are lines best-fit to square data points 1306 and circle data points 1308, respectively, using linear regression. Dashed line 1310 is represented by the equation $$\theta = -31.2T + 808,$$

where $\theta$ is pitch and T is temperature. Dashed-dotted line 1312 is represented by the equation $$\theta = -4.1T + 191.$$

Dashed-dotted line 1312 has a slope of −4.1 microradians-per-degree-Celsius, approximately a factor of eight less than a slope of −31.2 microradians-per-degree-Celsius for dashed line 1310. In addition, it may be assumed that the pitches of kinematic optical mounts 100(1) and 100(2) changed similarly, since both kinematic optical mounts 100(1) and 100(2) were at the room temperature T. Therefore, the slopes of dashed-dotted line 1312 and dashed line 1310 may be divided by two to obtain the temperature dependence of pitch 1204 for one of kinematic optical mounts 100(1) and 100(2). Therefore, stabilizing locking clamp 300 reduces the temperature dependence of pitch 1204 from 15.6 microradians-per-degree-Celsius (unclamped) to 2.1 microradians-per-degree-Celsius (clamped).

Applicant also used experimental setup 1100 of FIGS. 11 and 12 to measure the temperature dependence of yaw of kinematic optical mount 100(1), with and without stabilizing locking clamp 300(1) clamped to kinematic optical mount 100(1). Applicant found that the temperature dependence of yaw did not change when stabilizing locking clamp 300(1) was clamped to kinematic optical mount 100(1).

Figure 14:
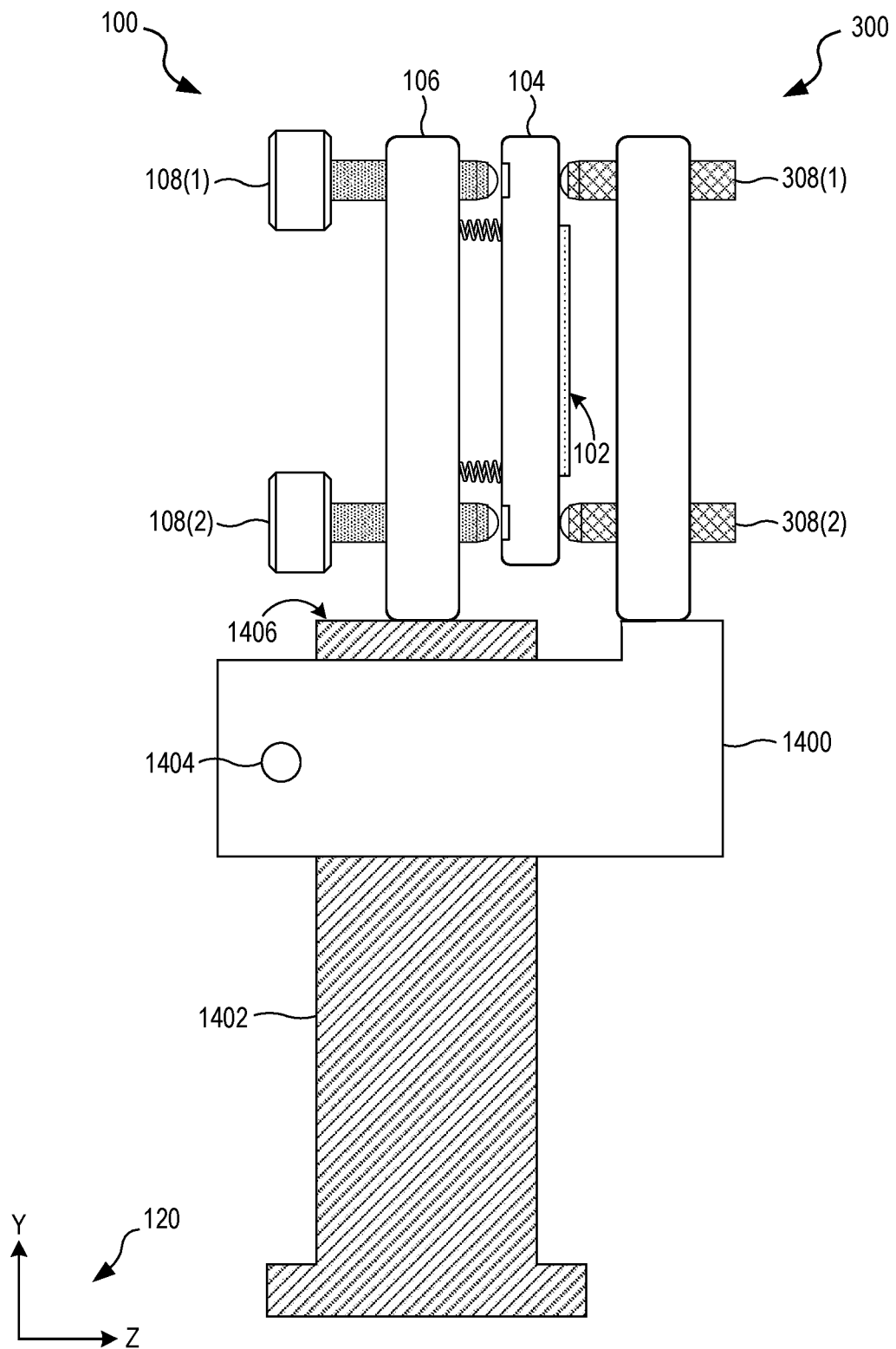
FIG. 14 is a side view of an example pedestal mount being used to mount the stabilizing locking clamp of FIG. 3 to a pedestal, in embodiments.

FIG. 14 is a side view of an example pedestal mount 1400 being used to mount stabilizing locking clamp 300 to a pedestal 1402. Pedestal mount 1400 is a single-split collar that is positioned around pedestal 1402 and secured to pedestal 1402 using a clamping mechanism 1404. Advantageously, pedestal mount 1400 may be positioned along the y-direction of pedestal 1402 and rotated around pedestal 1402 in the x-z plane (see coordinate system 120) to allow stabilizing locking clamp 300 to be positioned in front of kinematic optical mount 100 in the push-push configuration (i.e., each of clamp actuators 308 is aligned with a corresponding one of linear actuators 108).

In one example usage of pedestal mount 1400, dowel pins are used to establish a position and clocking angle (e.g., in the x-z plane) of kinematic optical mount 100 on pedestal 1402. For example, a top face 1406 of pedestal 1402 and a bottom face of rear plate 106 may be configured with holes to receive the dowel pins. Kinematic optical mount 100 may be removed from pedestal 1402, after which pedestal mount 1400 may be inserted around pedestal 1402. Kinematic optical mount 100 may then be re-affixed to pedestal 1402, with the dowel pins ensuring that kinematic optical mount 100 returns to the original position and clocking angle. Pedestal mount 1400 may then be positioned along and clamped to pedestal 1402, as described above.

Figure 15:
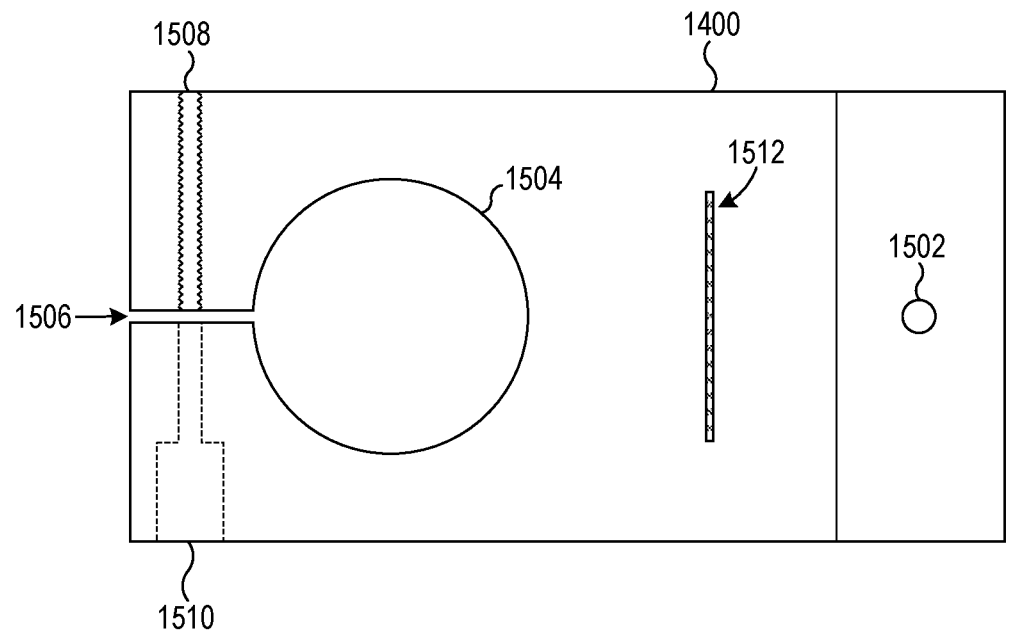
FIG. 15 is a top view of the pedestal mount of FIG. 14, in an embodiment.
Figure 15:
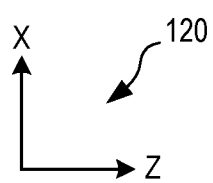

FIG. 15 is a top view of pedestal mount 1400 of FIG. 14. Pedestal mount 1400 forms a hole 1504 sized to accept pedestal 1402. A screw may be inserted into a counterbore hole 1510 and fastened into a tapped hole 1508 to reduce split 1506, thereby clamping pedestal mount 1400 against pedestal 1402. Pedestal mount 1400 also has a clamp plate mounting hole 1502 for affixing clamp plate 304 to pedestal mount 1400. For example, when first and/or second mounting hole 508, 510 is a counterbore hole, clamp plate mounting hole 1502 may be a tapped hole configured to accept a screw inserted through first or second mounting hole 508, 510 and tightened accordingly. Alternatively, when first or second mounting hole 508, 510 is a threaded hole, clamp plate mounting hole 1502 may be a through hole or counterbore hole configured to accept a screw that fastens into first or second mounting hole 508, 510.

As shown in FIG. 15, pedestal mount 1400 may also form a slit 1512 into which an alignment card (e.g., a piece of paper, cardboard, or infrared viewing card) may be placed to aid alignment of an optical beam onto optic 102. For example, the alignment card may include a grid or crosshairs used to facilitate centering of the optical beam (i.e., the x and y directions) on optic 102. In the z-direction, slit 1512 is located such that the alignment card, when inserted into slit 1512, is located in front of optic 102 and behind front plate 304. The alignment card may be easily inserted and removed from slit 1512, without physically disturbing both kinematic optical mount 100 and stabilizing locking clamp 300, to check and/or change the alignment of the optical beam as needed.

In another embodiment, pedestal mount 1400 is configured as a double-split collar that advantageously clamps around pedestal 1402 without requiring kinematic optical mount 100 to be removed from pedestal 1402. In this embodiment, pedestal mount 1400 includes two pieces that clamp together with two or more screws.

Figure 16:
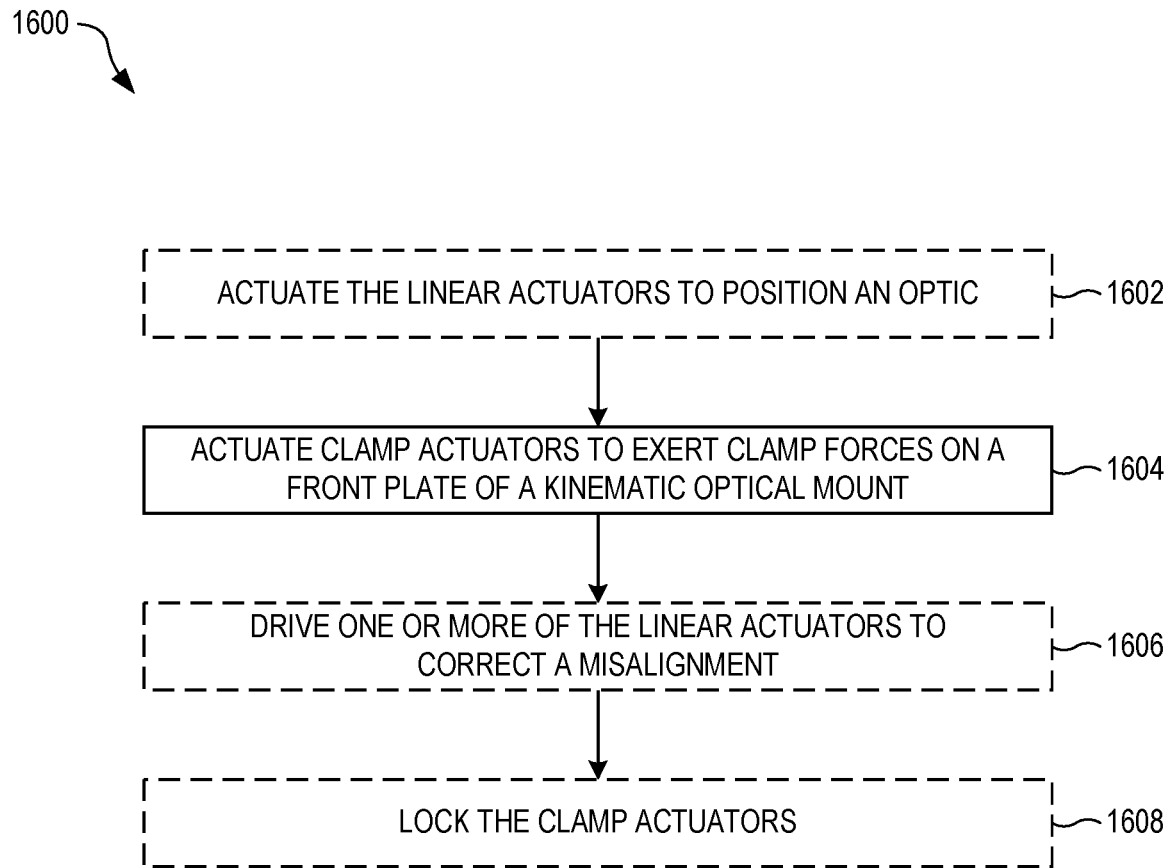
FIG. 16 is a block diagram of one example method that stabilizes a kinematic optical mount, in embodiments.

FIG. 16 is a block diagram of one example method 1600 that stabilizes a kinematic optical mount. Thus, method 1600 stabilizes an optic mounted in the kinematic optical mount. Method 1600 may be implemented, for example, with stabilizing locking clamp 300 of FIGS. 3 and 5-6, or with clamp arms 702 of FIGS. 7-10.

Method 1600 includes a step 1604 to actuate a plurality of clamp actuators to exert on a front plate of the kinematic optical mount clamp forces that oppose contact forces exerted on the front plate by a plurality of linear actuators. In one example of step 1604, clamp actuators 308 exert clamp forces 416 on front plate 104 of kinematic optical mount 100, wherein clamp forces 416 oppose contact forces 116 exerted on front plate 104 by linear actuators 108. In one embodiment, step 1604 actuates the clamp actuators in a sequence to minimize disturbing an orientation of the front plate.

In one embodiment, method 1600 includes a step 1602 to actuate the linear actuators, prior to actuating the clamp actuators, to position an optic mounted in the front plate of the kinematic optical mount. The linear actuators may be actuated to position the optic by changing one or more of the pitch, yaw, and z-position of the front plate. In one example of step 1602, linear actuators 108 of kinematic optical mount 100 are actuated to position optic 102 by changing one or more of the pitch, yaw, and z-position of front plate 104.

In another embodiment, method 1600 includes a step 1606 to drive, after actuating the clamp actuators (i.e., step 1604), one or more of the linear actuators to correct a misalignment of an optic in the front plate of the kinematic optical mount, the misalignment having been caused by actuating the clamp actuators (i.e., step 1604). Step 1606 may correct the misalignment of the optic by changing one or more of the pitch, yaw, and z-position of the front plate. By driving the one or more of the linear actuators, step 1606 increases the corresponding one or more contact forces exerted on the front plate. In one example of step 1606, one or more of linear actuators 108 of kinematic optical mount 100 are actuated to increase corresponding one or more contact forces 116 exerted on front plate 104 after clamp actuators 308 have been actuated to exert clamp forces 416 on front plate 104.

Step 1606 advantageously corrects for changes to the pitch and/or yaw of the front plate caused during step 1604. Applicant has found that step 1604 may change each of the pitch and yaw of the kinematic optical mount by 1 microradian, or more. Furthermore, Applicant has found that subsequent adjustment of the linear actuators can compensate for these changes to recover the pitch and yaw obtained before step 1604 (e.g., after step 1602).

In another embodiment, method 1600 includes a step 1608 to lock the clamp actuators after actuating the clamp actuators. In one example of step 1608, each of clamp actuators 308 includes screw 504, wherein each of clamp actuators 308 may be locked by tightening a locking nut threaded onto screw 504. In one embodiment, where step 1608 causes a misalignment of the optic, step 1608 may be followed by step 1606 to correct the misalignment.

In another embodiment, step 1606 occurs twice, once after step 1604 to correct the misalignment caused by step 1604, and once after step 1608 to correct the misalignment caused by step 1608. In another embodiment, steps 1604, 1606, and/or 1608 are iterated in any order and any number of times to clamp the front plate and remove misalignments caused by any instance of steps 1604 and/or 1608. Thus, in this embodiment, steps 1604, 1606 and 1608 are implemented in piece-wise fashion.

Embodiments with Offset Clamp and Contact Forces

Figure 17:
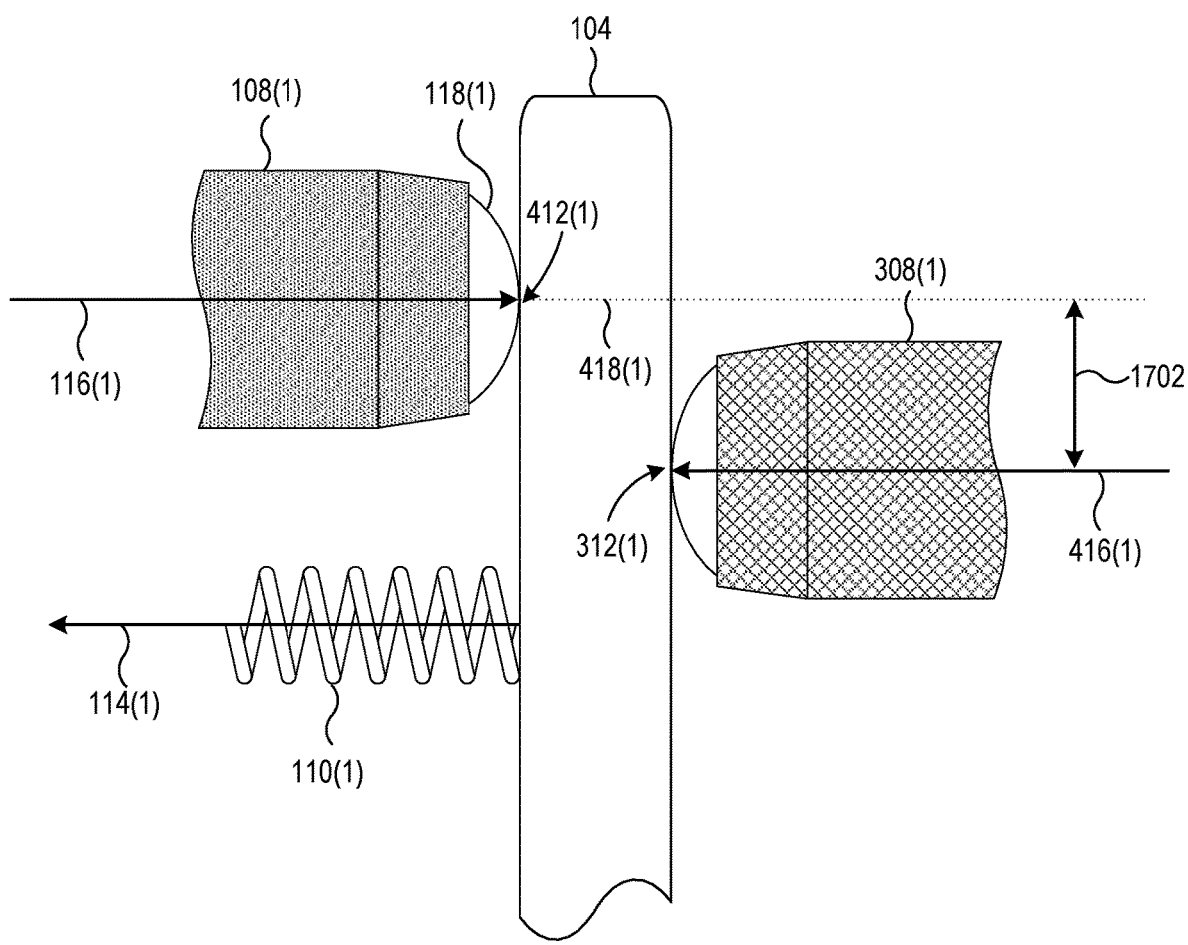
FIG. 17 shows a clamp actuator applying a clamp force at a front contact point when the front contact point is not directly aligned with a rear contact point, in embodiments.

FIG. 17 shows clamp actuator 308(1) applying clamp force 416(1) at front contact point 312(1) when front contact point 312(1) is not directly aligned with rear contact point 412(1). That is, contact force 116(1) and clamp force 416(1) are applied to front face 104 with a transverse offset 1702 in the y-direction, and thus do not form the push-push configuration described above in reference to FIG. 4. In this case, clamp force 416(1) still opposes contact force 116(1) in that clamp force 416(1) and contact force 116(1) act in opposite directions. However, while clamp force 416(1) and contact force 116(1) are still anti-parallel in FIG. 17, they are no longer coincident. Nevertheless, as clamp force 416(1) increases, contact force 116(1) will still increase in response, and increased clamp force 116(1) and increased contact force 416(1) will still "squeeze" front plate 104 to increase the pointing stability of kinematic optical mount 100 similarly to the push-push configuration illustrated in FIG. 4.

Due to transverse offset 1702, contact force 116(1) and clamp force 416(1) may generate a first torque on front plate 104 that scales with transverse offset 1702. Although not shown in FIG. 17, contact force 116(2) and clamp force 416(2) may also generate a second torque on front plate 104 when clamp force 416(2) is transversely offset from contact force 116(2). Similarly, contact force 116(3) and clamp force 416(3) may generate a third torque on front plate 104 when clamp force 416(3) is transversely offset from contact force 116(3). Each of three front contact points 312 may be chosen with a transverse offset such that the first, second, and third torques cooperate with other torques acting on front plate 104 (e.g., due to spring preload forces 114) to keep front plate 104 rotationally stationary.

While FIG. 17 shows front contact point 312(1) offset from rear contact point 412(1) in the negative y direction (i.e., transverse offset 1702 is negative), front contact point 312(1) may be alternatively offset from rear contact point 412(1) in the positive y direction. Advantageously, when front contact point 312(1) is closer to an edge of front plate 104, stabilizing locking clamp 300 may be configured to have a larger optical access 310. While FIG. 17 shows transverse offset 1702 in the y direction, transverse offset 1702 may be in the x direction, or a combination of the x and y directions, without departing from the scope hereof.

Figure 18:
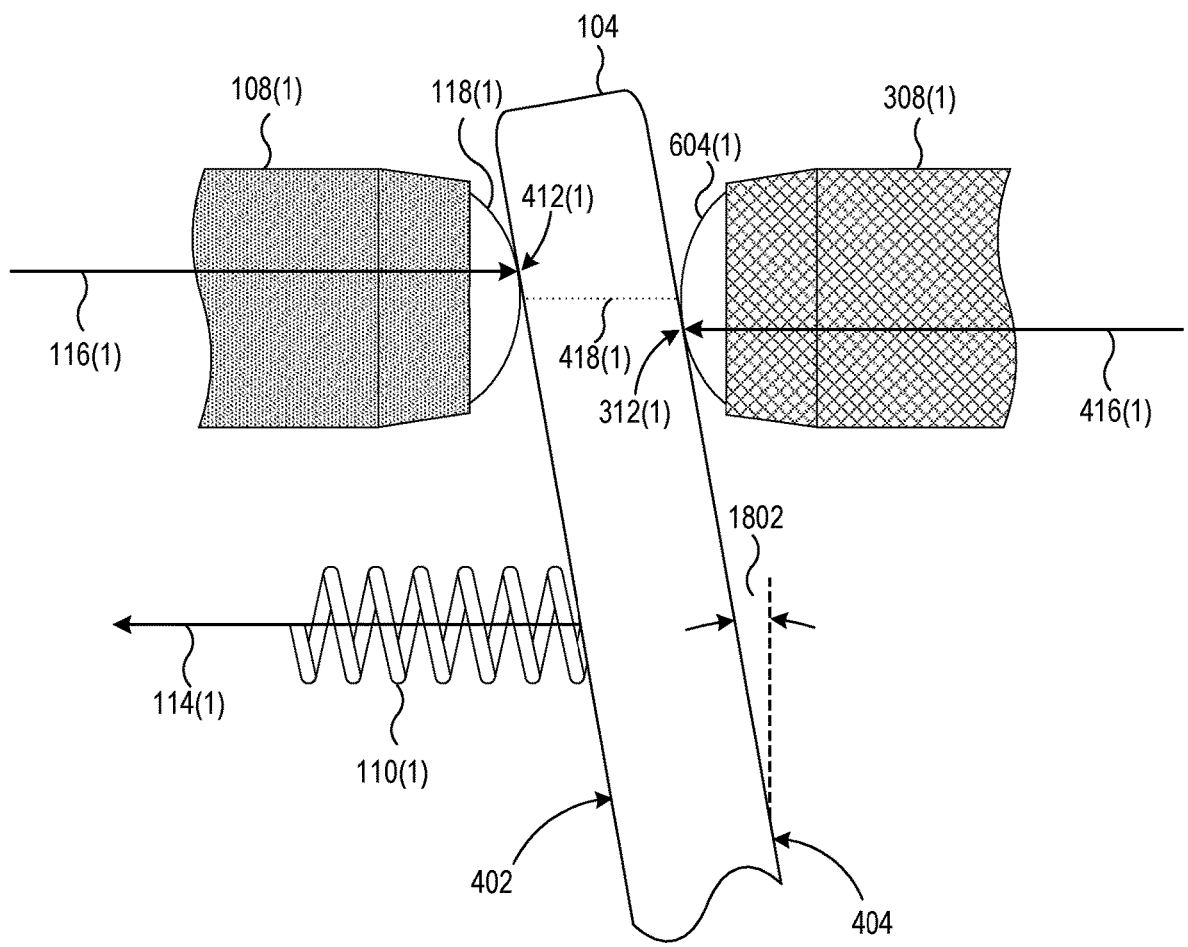
FIG. 18 shows a clamp actuator applying a clamp force at a front contact point that is transversely offset from a rear contact point due to a pitch angle of a front plate, in embodiments.

FIG. 18 shows clamp actuator 308(1) applying clamp force 416(1) at front contact point 312(1) that is transversely offset from rear contact point 412(1) due to a pitch angle 1802 of front plate 104. In FIG. 18, where front plate 1802 is tilted upwards (i.e., towards the positive y direction), front contact point 312(1) occurs at a lower y-value than shown in FIG. 4, and rear contact point 412(1) occurs at a higher y-value than shown in FIG. 4. Thus, contact force 116(1) is no longer applied to front face 104 via a center of spherical tip 118(1), and clamp force 416(1) is no longer applied to front face 104 via a center of tip 604(1). When clamp actuator 308(1) is configured in the push-push configuration with pitch angle 1802 at zero degrees, the push-push configuration will not be maintained for non-zero pitch angle 1802. Nevertheless, clamp force 416(1) still opposes contact force 116(1), and the transverse offset that arises from non-zero pitch angle 1802 is small enough that increased clamp force 416(1) and contact force 116(1) may still "squeeze" front plate 104 to increase the pointing stability of kinematic optical mount 100 similarly to the push-push configuration.

Although not shown in FIG. 18, similar arguments hold for linear actuators 108(2), 108(3) and clamp actuators 308(2), 308(3). For example, front contact point 312(2) and rear contact point 412(2) will become transversely offset from each other in the x-direction when a yaw angle of front plate 104 is adjusted. Thus, when clamp actuator 308(2) is configured in the push-push configuration with front plate 104 at a zero-degree yaw angle (i.e., front plate 104 lies flat in the x-y plane), the push-push configuration will not be maintained for a non-zero yaw angle. Nevertheless, clamp force 416(2) still opposes contact force 116(2), and the transverse offset that arises from a non-zero yaw angle is small enough that increased clamp force 416(2) and contact force 116(2) may still "squeeze" front plate 104 to increase the pointing stability of kinematic optical mount 100.

Clamp force 416(1) is also referred to herein as "opposing" contact force 116(1) when clamp force 416(1) has a force component anti-parallel to contact force 116(1). Thus, clamp force 416(1) need not be completely anti-parallel with contact force 116(1). Each of clamp force 416(1) and/or contact force 116(1) may have a force component along the x and/or y directions due, for example, to machining tolerances, surface irregularities, thermal drift, and other effects. In such cases, the force component of clamp force 416(1) anti-parallel with contact force 116(1) cooperates with contact force 116(1) to "squeeze" front plate 104 and increase pointing stability. Similar arguments apply to clamp force 416(2) "opposing" contact force 116(2), and clamp force 416(3) "opposing" contact force 116(3).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A stabilizing kinematic optical mount, comprising:
a rear plate;
a front plate configured to receive an optic;
a plurality of linear actuators mounted to the rear plate and configured to exert contact forces on the front plate;
a plurality of clamp arms affixed to the rear plate and configured to allow optical access to the optic; and
a plurality of clamp actuators mounted to the plurality of clamp arms and configured to exert, on the front plate, clamp forces opposing the contact forces.

2. The stabilizing kinematic optical mount of claim 1, the plurality of clamp actuators being mounted to the plurality of clamp arms such that the clamp forces and the contact forces form a push-push configuration.

3. The stabilizing kinematic optical mount of claim 2, wherein:

each of the plurality of clamp actuators is positioned to exert a respective one of the clamp forces on a front contact point of the front plate; and
each of the plurality of linear actuators is positioned to exert a respective one of the contact forces on a rear contact point of the front plate.

4. The stabilizing kinematic optical mount of claim 3, wherein said each of the plurality of clamp actuators comprises a screw with a tip configured to physically couple with the front contact point in response to turning of the screw.

5. The stabilizing kinematic optical mount of claim 4, wherein said each of the plurality of clamp actuators further comprises a bushing that is internally threaded to receive the screw and affixed to one of the clamp arms.

6. The stabilizing kinematic optical mount of claim 4, wherein said each of the plurality of clamp actuators further comprises a bushing that is internally threaded to receive the screw and affixed to a respective one of the plurality of clamp arms by threading into a tapped hole formed by said respective one of the plurality of clamp arms.

7. The stabilizing kinematic optical mount of claim 4, wherein said each of the plurality of clamp actuators is mounted to a respective one of the plurality of clamp arms by a clamping mechanism.

8. The stabilizing kinematic optical mount of claim 4, the plurality of clamp actuators comprising three clamp actuators.

9. A stabilizing locking clamp for a kinematic optical mount, comprising:
a clamp plate configured to allow optical access to an optic mounted in the kinematic optical mount; and
a plurality of clamp actuators mounted to the clamp plate and configured to exert clamp forces on a front face of a front plate of the kinematic optical mount, the clamp forces opposing contact forces exerted by a plurality of linear actuators of the kinematic optical mount on a rear face of the front plate, each of the plurality of clamp actuators being positioned to exert a respective one of the clamp forces on a front contact point of the front face.

10. The stabilizing locking clamp of claim 9, the clamp plate being configured to mount to a base such that the stabilizing locking clamp is in front of the optic while allowing optical access to the optic.

11. The stabilizing locking clamp of claim 10, the clamp plate being configured to mount to the base in both a left-hand configuration and a right-hand configuration.

12. The stabilizing locking clamp of claim 9, the clamp plate being configured to mount to a rear plate of the kinematic optical mount such that the stabilizing locking clamp is in front of the optic while allowing optical access to the optic.

13. The stabilizing locking clamp of claim 12, the clamp plate being configured to mount to the rear plate of the kinematic optical mount in both a left-hand configuration and a right-hand configuration.

14. The stabilizing locking clamp of claim 9, further comprising the kinematic optical mount.

15. A method for stabilizing a kinematic optical mount, comprising:
actuating a plurality of clamp actuators to exert, on a front face of a front plate of the kinematic optical mount, clamp forces that oppose contact forces exerted on a rear face of the front plate by a plurality of linear actuators of the kinematic optical mount;

wherein each of the plurality of clamp actuators, after said actuating, exerts a respective one of the clamp forces on a front contact point of the front face.

16. The method of claim 15, further comprising locking the clamp actuators after said actuating the plurality of clamp actuators.

17. The method of claim 15, further comprising disengaging springs of the kinematic optical mount from the front plate after said actuating the plurality of clamp actuators.

18. The method of claim 15, further comprising actuating the plurality of linear actuators, prior to said actuating the plurality of clamp actuators, to position an optic mounted in the front plate of the kinematic optical mount.

19. The method of claim 15, further comprising driving, after said actuating the plurality of clamp actuators, one or more of the plurality of linear actuators to correct a misalignment of an optic mounted in the front plate of the kinematic optical mount, the misalignment having been caused by said actuating the plurality of clamp actuators.

20. The method of claim 15, wherein the plurality of clamp actuators are mounted to a clamp plate that allows optical access to an optic mounted in the kinematic optical mount.

\* \* \* \* \*